(12) United States Patent
Yates et al.

(10) Patent No.: US 11,204,168 B2
(45) Date of Patent: Dec. 21, 2021

(54) COMBUSTION STAGING SYSTEM

(71) Applicant: ROLLS-ROYCE PLC, London (GB)

(72) Inventors: Martin K. Yates, East Haddon (GB); Daniel J. Bickley, Solihull (GB)

(73) Assignee: ROLLS-ROYCE plc, London (GB)

( * ) Notice: Subject to any disclaimer, the term of this patent is extended or adjusted under 35 U.S.C. 154(b) by 239 days.

(21) Appl. No.: 16/011,865

(22) Filed: Jun. 19, 2018

(65) Prior Publication Data

US 2018/0372321 A1 Dec. 27, 2018

(30) Foreign Application Priority Data

Jun. 23, 2017 (GB) .................................. 1710052

(51) Int. Cl.
*F23R 3/34* (2006.01)
*F23R 3/28* (2006.01)
(Continued)

(52) U.S. Cl.
CPC ................ *F23R 3/346* (2013.01); *F02C 7/14* (2013.01); *F02C 7/222* (2013.01); *F02C 7/228* (2013.01); *F02C 7/232* (2013.01); *F02C 7/236* (2013.01); *F02C 9/263* (2013.01); *F02C 9/34* (2013.01); *F23K 5/06* (2013.01); *F23K 5/147* (2013.01); *F23R 3/283* (2013.01); *F23R 3/343* (2013.01); *F05D 2240/35* (2013.01);
(Continued)

(58) Field of Classification Search
CPC .......... F23R 3/346; F02C 7/222; F02C 7/228; F02C 7/232; F02C 9/263
See application file for complete search history.

(56) References Cited

U.S. PATENT DOCUMENTS

| 4,337,616 A | 7/1982 | Downing |
|---|---|---|
| 4,949,538 A | 8/1990 | Iasillo et al. |

(Continued)

FOREIGN PATENT DOCUMENTS

| GB | 2041085 A | 9/1980 |
|---|---|---|
| GB | 2532388 A | 5/2016 |

OTHER PUBLICATIONS

U.S. Appl. No. 16/012,054, filed Jun. 19, 2018 in the name of Daniel J Bickley.

(Continued)

*Primary Examiner* — Arun Goyal
(74) *Attorney, Agent, or Firm* — Oliff PLC

(57) ABSTRACT

A combustion staging system has: a splitter; pilot and mains fuel manifolds; mains flow control valves; and fuel servo line. Each mains flow control valve has a chamber containing a piston, the chamber to a piston mains side fed by the mains fuel manifold, and the chamber to a piston servo side fed by the servo line. The piston has an open pilot-and-mains position allowing flow from the chamber mains side to the respective injector mains discharge orifice. The piston prevents flow from the chamber mains side. The piston is movable under a pressure change in the servo line relative to the mains fuel manifold. The system has a servo pump and a hydraulic motor driving it. The servo pump changes fuel pressure. Motive power for the hydraulic motor is fuel diverted from a fuel pump high pressure output, the motor returning the diverted fuel to a low pressure input.

9 Claims, 13 Drawing Sheets

(51) Int. Cl.

| | | |
|---|---|---|
| F23K 5/14 | (2006.01) | |
| F23K 5/06 | (2006.01) | |
| F02C 9/34 | (2006.01) | |
| F02C 7/228 | (2006.01) | |
| F02C 7/232 | (2006.01) | |
| F02C 9/26 | (2006.01) | |
| F02C 7/14 | (2006.01) | |
| F02C 7/22 | (2006.01) | |
| F02C 7/236 | (2006.01) | |

(52) U.S. Cl.
CPC .... *F05D 2260/406* (2013.01); *F05D 2270/31* (2013.01); *F23N 2235/18* (2020.01); *F23N 2235/24* (2020.01)

(56) References Cited

U.S. PATENT DOCUMENTS

| | | | | |
|---|---|---|---|---|
| 4,992,027 | A * | 2/1991 | Acosta | F02C 7/232 |
| | | | | 251/63 |
| 5,339,636 | A | 8/1994 | Donnelly et al. | |
| 5,442,922 | A | 8/1995 | Dyer et al. | |
| 5,881,550 | A * | 3/1999 | Toelle | F02C 7/228 |
| | | | | 60/39.094 |
| 6,955,040 | B1 * | 10/2005 | Myers, Jr. | F02C 7/22 |
| | | | | 60/39.281 |
| 8,192,172 | B2 * | 6/2012 | Baker | F02C 7/232 |
| | | | | 417/43 |
| 8,887,752 | B2 * | 11/2014 | Rawlinson | F02C 7/228 |
| | | | | 137/98 |
| 8,925,322 | B2 | 1/2015 | Scully et al. | |
| 9,121,349 | B2 | 9/2015 | Griffiths et al. | |
| 9,404,423 | B2 | 8/2016 | Griffiths et al. | |
| 9,574,448 | B2 * | 2/2017 | Snodgrass | F23R 3/34 |
| 10,288,294 | B2 | 5/2019 | Griffiths et al. | |
| 10,294,866 | B2 | 5/2019 | Baker | |
| 2011/0146823 | A1 | 6/2011 | Griffiths et al. | |
| 2011/0289925 | A1 | 12/2011 | Dyer et al. | |
| 2012/0159953 | A1 | 6/2012 | Griffiths et al. | |
| 2013/0042920 | A1 | 2/2013 | Snodgrass et al. | |
| 2015/0192075 | A1 | 7/2015 | Griffiths | |
| 2016/0273775 | A1 | 9/2016 | Griffiths et al. | |
| 2017/0298840 | A1 | 10/2017 | Doody | |

OTHER PUBLICATIONS

U.S. Appl. No. 16/012,436, filed Jun. 19, 2018 in the name of Michael Griffiths.
U.S. Appl. No. 16/011,741, filed Jun. 19, 2018 in the name of Daniel J Bickley.
Jun. 24, 2020 Office Action Issued in U.S. Appl. No. 16/012,436.
May 27, 2020 Office Action issued in U.S. Appl. No. 16/011,741.
May 29, 2020 Office Action issued in U.S. Appl. No. 16/012,054.
Nov. 18, 2020 Office Action issued in U.S. Appl. No. 16/011,741.
Dec. 16, 2020 Office Action issued in U.S. Appl. No. 16/012,436.

* cited by examiner

COMBUSTION STAGING SYSTEM

FIELD OF THE INVENTION

The present invention relates to a combustion staging system for fuel injectors of a multi-stage combustor of a gas turbine engine.

BACKGROUND

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging condition.

A typical annular combustor has a circumferential arrangement of fuel injectors, each associated with respective pilot and mains feeds extending from the circumferentially extending pilot and mains manifolds. Each injector generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the injectors, a check valve, known as a flow scheduling valve (FSV), is typically associated with each feed in order to retain a primed manifold when de-staged and at shut-down. The FSVs also prevent fuel flow into the injector nozzle when the supply pressure is less than the cracking pressure (i.e. less than a given difference between manifold pressure and combustor gas pressure).

Multi-stage combustors may have further stages and/or manifolds. For example, the pilot manifold may be split into two manifolds for lean blow-out prevention during rapid engine decelerations.

During pilot-only operation, the splitter valve directs fuel for burner flow only through the pilot fuel circuit (i.e. pilot manifold and feeds). It is therefore conventional to control temperatures in the de-staged (i.e. mains) fuel circuit to prevent coking due to heat pick up from the hot engine casing. One known approach, for example described in EP A 2469057, is to provide a separate recirculation manifold which is used to keep the fuel in the mains manifold cool when it is deselected. It does this by keeping the fuel in the mains manifold moving, although a cooling flow also has to be maintained in the recirculation manifold during mains operation to avoid coking.

However, a problem with such a system is how to accommodate a mains FSV failing to an open condition. In pilot-only operation, when cooling flow is passing through the recirculation manifold and the mains manifold, such a failure can result in the cooling flow passing through the failed open FSV through one injector into the combustor, causing a hot streak which may lead to nozzle and turbine damage. In pilot and mains operation, such a failure can produce a drop in mains manifold pressure which causes other mains FSVs to close. A possible outcome is again that a high proportion of the total mains flow passes through the failed open FSV to one injector, causing a hot streak leading to nozzle and turbine damage.

In principle, such failure modes can be detected by appropriate thermocouple arrangements, e.g. to detect hot streaks. However, temperature measurement devices of this type can themselves have reliability issues.

Further, the problem of mains FSV failure can be exacerbated by system arrangements used to prevent combustion chamber gas ingress through the fuel injectors during pilot only operation. Whilst the impact of such gas ingress is generally non-hazardous, it can lead to hot gas-induced degradation of FSV seals. Degraded FSV sealing can in turn lead to dribbling of fuel into de-staged nozzles, resulting in component blockage due to coking.

US 2016/0273775 proposes a fuel staging system (reproduced in FIG. 1) that addresses some of the above problems. The staging system splits the fuel under the control of the engine electronic controller (EEC—not shown) into two flows: one at a pressure $PB_{p1}$ for first 331 and second 332 pilot manifolds and the other at a pressure $P_{fsv}$ for a mains manifold 333. The first pilot manifold feeds pilot discharge orifices of a subset of the fuel injectors. The second pilot manifold feeds pilot discharge orifices of the rest of the fuel injectors. The mains manifold feeds mains discharge orifices of all the fuel injectors. Mains fuel flow scheduling valves (FSVs) 340 at the injectors prevent combustion chamber gases entering the respective manifolds and also provide a drip tight seal between the mains manifold and the injectors when mains is de-staged. By varying the fuel split between the manifolds, the EEC can thus perform staging control of the engine.

In more detail, the staging system 330 has a fuel flow splitting valve (FFSV) 335, which receives a metered fuel flow from a hydro-mechanical unit (HMU) of the engine at pressure $P_{fmu}$. A spool is slidable within the FFSV under the control of a servo-valve 346, the position of the spool determining the outgoing flow split between a pilot connection pipe 336 which delivers fuel to the first 331 and second 332 pilot manifolds and a mains connection pipe 337 which delivers fuel to the mains manifold 333. The spool can be positioned so that the mains stage is deselected, with the entire metered flow going to the pilot stage (except that a cooling flow is sent to the mains manifold during pilot-only operation, as discussed in more detail below). An LVDT (not shown) can provide feedback on the position of the spool to the EEC, which in turn controls staging by control of the servo-valve 346.

The pilot discharge orifices are divided into two groups by the first 331 and second 332 pilot manifolds in order to provide lean blow out protection. More particularly, the second pilot manifold connects to the pilot connection pipe 336 via a further connection pipe 339 (at a pressure $PB_{p2}$) and a lean blow out protection valve 341. This is operable to terminate or substantially reduce the supply of fuel to the second pilot manifold and associated pilot discharge orifices, when desired, so as to increase the flow of fuel to the first pilot manifold and associated discharge orifices under low fuel conditions for a given metered flow from the HMU. In the arrangement illustrated, the valve 341 is controlled by way of a solenoid operated control valve 342, although other forms of control are possible, such as by a servo-type valve (for example an electro hydraulic servo-valve). In this way, under low fuel conditions the flow of fuel to the pilot discharge orifices may be directed preferentially via the first pilot manifold, whereby the risk of a lean blow out condition arising can be reduced. Further details of such lean blow out protection are described in EP A 2469057.

The part of the staging system 330 comprising the FFSV 335, servo-valve 346, lean blow out protection valve 341 and control valve 342 may be housed in a staging unit mounted to a fan case of the engine. The connection pipes 336, 337, 339 then extend across a bypass duct of the engine to the manifolds 331, 332, 333, which wrap around the core engine in proximity to the injectors 334. Alternatively, the staging system can be mounted to the engine core.

In the staging system described in EP A 2469057, each injector has a pilot FSV and a mains FSV for respectively the flows from pilot and mains manifolds. In contrast, in the staging system shown in FIG. 1, pilot FSVs are not necessary (although optional pilot FSVs can be located between the mains FSVs 340 and the pilot discharge orifices), and instead pilot flow is routed through modified mains FSVs 340 with negligible restriction: the mains FSVs 340 distribute the mains flow from the mains manifold 333 to the mains discharge orifices in the injectors 334, while the pilot flow is passed through the mains FSVs for valve cooling purposes. These FSVs each have a chamber containing a movable, spring-biased piston, with the chamber to a pilot (spring) side of the piston being in fluid communication with the respective pilot fuel manifold 331, 332 and the chamber to a mains (non-spring) side of the piston being in fluid communication with the mains fuel manifold 333. In this way, the FSVs 340 have a reduced cracking pressure with the pilot (spring) side of the FSVs being referenced to pilot manifold pressure ($PB_{p1}$ or $PB_{p2}$) rather than the lower mains pressure downstream of the FSVs (as is the case with the system of EP A 2469057). With the low cracking pressure, the pressures on either side of each piston ($P_{fsv}$ and $PB_p$) are approximately equal during the pilot-only operating mode such that the FSV springs maintain the FSVs 140 in a closed position (i.e. no flow from the mains manifold 333 through the FSVs to the mains discharge orifices of the injectors 334). The approximate equalisation of the pressures $P_{fsv}$ and $P_{bp}$ is achieved by energising open a single-stage solenoid-operated mains cooling valve 347 which allows a small cooling flow through the mains manifold 333 to pass to the second pilot manifold 332 through a port in the solenoid valve 347 that is significantly larger than the port in the FFSV 335 feeding the mains connection pipe 337.

In this pilot-only operating mode, the position of the FFSV 335, controlled by the servo-valve 346, is such that there is a large flow number opening between the HMU supply and the pilot connection pipe 336, such that $P_{fmu} \approx PB_{p1} \approx P_{fsv}$. Any difference between the metered fuel pressure ($P_{fmu}$) from the HMU supply and the pilot manifold pressures ($PB_{p1}$ and $PB_{p2}$) is insufficient to open the FSVs 340. In the pilot-only mode there is a small opening in the FFSV between the HMU supply and the mains connection pipe 337 to allow for the cooling flow in the mains manifold 333. The mains manifold remains fully primed in pilot-only mode to reduce the unprimed volume required to be filled when mains flow to the combustor is required. When mains staging is selected solenoid-operated mains cooling valve 347 is closed so that the connection between the mains manifold 333 and the second pilot manifold 332 is closed. Simultaneously, the FFSV 335 (controlled by the servo-valve 346) moves to increase the opening between the HMU supply and the mains connection pipe 337. This reduces $PB_{p1}$ and $PB_{p2}$ relative to $P_{fsv}$, resulting in fuel flow to the mains discharge orifices of the injectors 334.

If one of the FSVs 340 fails such that it opens in pilot-and-mains mode, fuel flows from the HMU supply through the FFSV 335 to the mains manifold 333 and thence through the open port in the failed FSV to the mains discharge orifice of the respective injector 334. However, as the FSVs have a relatively low cracking pressure, only a marginal increase in pressure in the mains manifold, resulting from flow through the port in the failed FSV, causes the other FSVs to open. This then leads to a relatively even distribution of fuel flow injection around the combustor. Thus, by ensuring that the other FSVs open before a severe level of fuel flow through the failed FSV is reached (i.e. a level that results in hot streaks and turbine damage), the staging system 330 can mitigate the potentially hazardous mal-distribution issues associated with failed open mains FSVs in the system of EP A 2469057. The latter incorporates high cracking pressure FSVs, potentially allowing a high level of flow to pass through a single failed open FSV (i.e. gross maldistribution) before the other FSVs crack open.

The staging system 330 also allows complex cooling recirculation architectures to be avoided, which avoids the hazards that can result from combustion gases leaking past mains FSVs and thence to the low pressure side of the fuel system of the system.

Cooling of the FSVs 340 can be provided by the pilot flow that is continuously routed through the FSVs. Cooling arrangements can be provided for the pilot manifolds 331, 332 and the mains 333 manifold, e.g. by using a small portion of the air flow through a bypass duct of the engine, and for the mains manifold in pilot-only operation using the cooling flow discussed below.

The pilot/mains flow split is achieved via movement of the spool within the FFSV 335, with a mains fuel flow sensing valve (MFFSV) 343 being provided on the mains connection pipe 337. The FFSV 335 then provides a coarse split and the MFFSV trims to the required accuracy. The position of the FFSV 335 is controlled via the servo-valve 346 using the position feedback signal from the LVDT 344 attached to the MFFSV 343 to give accurate flow control in the connection pipes 336 and 337. In particular, the position feedback signal that is input to the staging control logic in the EEC is taken from an LVDT 344 measuring a spool position of the MFFSV rather than a spool position of the FFSV. In such an arrangement, MFFSV spool position is a measure of the mains flow.

To provide the cooling flow in the mains manifold 333 during pilot-only operation, the single-stage solenoid-operated mains cooling valve 347 opens a bypass connection between the mains 333 and second pilot 332 fuel manifolds, allowing the cooling flow to pass from the mains fuel manifold to the pilot fuel manifold, and thence onwards for burning at the pilot orifices of the injectors 334. The mains cooling valve 347 closes during pilot-and-mains operation. The mains cooling valve has a relatively large minimum orifice size, and thus is relatively insensitive to contamination and ice build-up.

In the pilot-only operating mode, the cooling flow of fuel passes continuously from the mains manifold 333 to the second pilot fuel manifold 332, which maintains cooling in the mains manifold. This cooling flow is sensed by the MFFSV 343 and the feedback signal from the MFFSV LVDT 344 to the EEC is used to adjust the spool position of the FFSV 335 (via the servo-valve 346) if the cooling flow needs to be altered. In pilot-only operating mode, even with the cooling flow the pressure drop across each FSV piston ($P_{fsv} - PB_p$) is insufficient to open the FSVs.

When the pilot-and-mains operating mode is selected, the solenoid operated mains cooling valve 347 is closed, and the spool position of the FFSV 335 is altered to increase the opening of the mains port of the FFSV and reduce the opening of the pilot port of the FFSV, which increases the pressure differential $P_{fmu} - PB_{p1}$ across the pilot port, thus producing a rise in pressure $P_{fsv}$ relative to $PB_{p1}$ and $PB_{p2}$.

This results in the pistons of the FSVs 340 opening against their respective spring forces, and fuel flowing through the FSVs to the mains discharge orifices of the injectors 334. The MFFSV 343 now senses the flow to the mains discharge orifices of the injectors and the feedback signal from the LVDT 344 is used to adjust the FFSV spool position via the EEC and FFSV servo-valve 346 to set the correct pilot/ mains flow split.

Thus inclusion of the MFFSV 343 on the mains connection pipe 337 enables accurate control of the pilot/mains split irrespective of FSV tolerances, variation and friction. The MFFSV position from the LVDT 344 is a measure of mains manifold cooling flow during pilot-only operation, and total mains burnt flow during pilot-and-mains operation. This flow measurement signal is sent to and used by the EEC control logic to provide an MFFSV position demand signal that is used to drive the FFSV servo-valve 346 to move the FFSV 335 to set the correct pilot/mains flow split (during pilot-and-mains operation) or the correct mains cooling flow (during pilot-only operation).

Although the fuel staging system of US 2016/0273775 addresses many of the problems of the system of EP A 2469057, a difficulty arises in that the closed loop control of the fuel split using the MFFSV 343 also involves the EEC. In particular, the digital sample and hold processes of the EEC introduce phase lag in any control loop using the EEC. This limits the maximum gain that can be set within the loop, given loop stability considerations, and thus limits response of the closed loop. Typical sample periods for the EEC limit loop bandwidth to 1-2 Hz, which may not be fast enough for accurate dynamic control of fuel flow to the engine.

A difficulty in relation to the FSVs is variation in the level of piston/sleeve friction acting on individual FSVs. This can result in poor burner-to-burner flow distribution and thus impacts emissions and turbine life.

The difficulties associated with maldistribution due to a failed open FSV or valve-to-valve frictional variations can be addressed by increasing the size of the FSVs, as they can then have higher spring loads to provide a higher closing force margin and to reduce the impact of piston/sleeve friction on burner-to-burner flow distribution. More particularly, a high spring load requires a large piston diameter in order to reduce the pressure differential required to open the valve to an acceptable level. Indeed, it can be advantageous to minimise the required differential so as to limit burner-to-burner maldistribution in mains flow resulting from a stuck open FSV. A further driver for large FSVs is that pressure losses in the pilot manifold result in different pilot pressures at the FSVs. Although these losses are typically small, they can be significant relative to the differential pressure required to open each valve, and the spring load of all the FSVs must be high enough to ensure that the valve which sees the lowest pilot pressure is able to close and remain closed when de-staging mains. However, there are significant disadvantages with using large FSVs. They add weight to the engine, and also may not be feasible to implement if space constraints are tight.

SUMMARY

It would be desirable to provide a combustion staging system that addresses some or all of these difficulties.

In a first aspect, the present invention provides a combustion staging system for fuel injectors of a multi-stage combustor of a gas turbine engine, the system having:
  a splitting unit which receives a metered total fuel flow and controllably splits the metered total fuel flow into out-going pilot and mains fuel flows to perform pilot-only and pilot-and-mains staging control of the combustor;
  pilot and mains fuel manifolds which respectively receive the pilot and mains fuel flows;
  a plurality of mains flow control valves which distribute the mains fuel flow from the mains fuel manifold to mains discharge orifices of respective injectors of the combustor; and
  a fuel servo line which extends to the mains flow control valves;
  wherein each mains flow control valve has a chamber containing a movable piston, the chamber to a mains side of the piston being fed by the mains fuel manifold, the chamber to a servo side of the piston being fed by the servo line, the piston having an open pilot-and-mains position which allows flow out of the mains side of the chamber to the mains discharge orifice of the respective injector, the piston being biased towards a closed pilot-only position which prevents flow out of the mains side of the chamber to the mains discharge orifice of the respective injector, and the piston being movable between the open and closed positions under a change in pressure in the servo line relative to the mains fuel manifold; and
  wherein the system further has a servo pump and a hydraulic motor which drives the servo pump, the servo pump being operable to change the fuel pressure in the servo line, and motive power for the hydraulic motor being fuel diverted from a high pressure output of a fuel pump of the gas turbine engine, the motor returning the diverted fuel to a low pressure input of the fuel pump.

Advantageously, having the mains flow control valves operated by a pressure differential between the servo line and the mains fuel manifold allows many of the difficulties associated with the mains FSVs of US 2016/0273775 to be avoided. In particular, the force margins for the control valves can be large, making the system more robust to contamination and coking, with less sensitivity to variation in valve internal friction. This reduces the potential for burner-to-burner flow mal-distribution, and thus the potential for degraded emissions and excessive turbine life reduction. A high servo line pressure differential permits a smaller valve and thus eases packaging of the valve in a burner head of an injector.

In a second aspect, the present invention provides a fuel supply system having:
  a fuel pump having a low pressure input and a high pressure output;
  a fuel metering valve which is configured to receive a flow of pressurised fuel from the high pressure output and to form therefrom a metered total fuel flow; and
  a combustion staging system according to the first aspect, the splitting unit of the combustion staging system receiving the metered total fuel flow from the fuel metering valve, and the motive power for the hydraulic motor being fuel diverted from the high pressure output of the fuel pump, the motor returning the diverted fuel to the low pressure input of the fuel pump.

The fuel supply system may further have a pressure drop control arrangement (such as a spill valve and e.g. a pressure drop control valve) which is operable to maintain a substantially constant pressure drop across the total fuel metering valve. This spill valve can then be in parallel to the hydraulic motor (i.e. the spill valve connecting the high pressure output of the fuel pump to its low pressure input). The fuel supply system may further have a pressure raising and shut-off valve in the flow path of the metered total fuel flow between the total fuel metering valve and the combustion staging system.

In a third aspect, the present invention provides a gas turbine engine having the fuel supply system of the second aspect.

Optional features of the invention will now be set out. These are applicable singly or in any combination with any aspect of the invention.

The fuel pump can be a high pressure pumping stage of a pumping unit of the engine, the pumping unit having a low pressure pumping stage which draws fuel from a fuel tank and supplies the fuel at boosted pressure to an inlet of the high pressure pumping stage. However, another option is for the fuel pump to be an augmenter pump (e.g. of the type disclosed in EP A 2891781) which operates in parallel to the high pressure pumping stage of such a pumping unit, an inlet of the augmenter pump also being supplied with fuel at boosted pressure by the low pressure pumping stage. Such an augmenter pump it typically used to deliver pressurised fuel to one or more fuel-pressure operated auxiliary engine devices.

The servo pump can be a positive displacement pump, such as a gear pump etc. Another option, however, is for the servo pump to be a roto-dynamic pump, such as a centrifugal pump.

Typically the piston of the mains flow control valve is spring biased towards the closed pilot-only position. For example, the chamber to the servo side of the piston can contain a compression spring biasing the piston towards the closed pilot-only position.

The system may further have a controller which receives the diverted fuel from the high pressure output of the fuel pump and which controllably feeds the diverted fuel to the hydraulic motor to vary the speed of the servo pump. For example, the controller may include a servo-valve, or a hydromechanical throttle valve. The controller may further mediate the return of the diverted fuel to the low pressure input of the fuel pump. In this way, the controller can be operable to change the direction of flow of the diverted fuel through the hydraulic motor and thereby change the direction of operation of the servo pump.

The system may further have a sensor which senses the output of the servo pump. For example, the sensor may be a pressure transducer (e.g. operating in conjunction with a flow restrictor), a flow meter, or a rotary speed sensor. The sensor enables closed loop control of the controller, e.g. using an EEC.

The servo line may have a back pressure orifice downstream of the mains flow control valves, the back pressure orifice maintaining the changed pressure in the servo line.

The combustion staging system may further have a relief valve connected across the servo pump to relieve excess pressure in the servo line e.g. in the case of blockage at the back pressure orifice. Such a relief valve may be particularly desirable when the servo pump is a positive displacement pump.

The servo line may return to the servo pump in a closed loop after extending to the mains flow control valves. Another option, however, is for the servo pump to operate upon, and for the servo line to receive, a portion of the metered total fuel flow received by the splitting unit, the servo line returning said portion to the rest of the metered total fuel flow after having extended to the mains flow control valves. For example, the servo line can receive a portion of the pilot fuel flow or a portion of the mains fuel flow, and can return said portion to the respective flow for burning in the injectors.

The pilot fuel manifold may comprise a first pilot fuel manifold and a second pilot fuel manifold. The first pilot fuel manifold may then receive a first portion of the total pilot fuel flow and may direct flow to pilot discharge orifices of a first subset of the injectors of the combustor, while the second pilot fuel manifold may receive a second portion of the total pilot fuel flow and direct flow to pilot discharge orifices of a different, second subset of the injectors. Typically, flow to the second pilot fuel manifold and the second subset of the injectors can be restricted to provide lean blow out protection.

In a first variant, the mains fuel manifold may be split into a primary line and the servo line such that each line receives a respective portion of the mains fuel flow, both the primary line and the servo line extending to the mains flow control valves before reuniting, the chamber of each mains flow control valve to the mains side of its piston being fed by the primary line, and the piston of each mains flow control valve being movable under an increase in pressure in the servo line relative to the primary line to the open pilot-and-mains position.

In the first variant, the mains flow control valves may advantageously be binary operating valves which are either fully open or fully closed. This can substantially improve the operation and reliability of the valves. Also, from an operation perspective, if a binary operating valve fails open, it is then in the same state as a normally open valve, thus avoiding the potential for burner-to-burner flow mal-distribution when mains is staged-in, decreasing the potential for excessive turbine life reduction.

In the first variant, the mains flow control valves can conveniently have single face seals. This is because there is no need for a high degree of sealing between the primary and servo lines (i.e. a degree of leakage between these lines is acceptable). In contrast, the FSVs of US 2016/0273775 have dual-face seals to provide a drip tight seal to stop delivery of flow to the mains combustion process when mains is de-staged. Such dual-face seals are intrinsically less reliable and robust than single face seals.

In the first variant, the splitting unit may include a mains throttle valve which throttles the out-going mains fuel flow from the splitting unit in response to the pressure of the out-going pilot fuel flow from the splitting unit. In contrast, the FSVs of US 2016/0273775 throttle the mains flow therethrough in response to the pressure of the pilot flow. The mains throttle valve can displace flow in a similar way to the FSVs of US 2016/0273775, but being a single valve its net displacement area can be significantly smaller. This can decrease dynamic cross-talk between the pilot and mains flows, thereby reducing undesirable flow transients. The inclusion of a mains throttle valve can be particularly beneficial when the mains flow control valves are binary operating valves.

In a second variant, the mains flow control valves are mains flow scheduling valves, and the piston of each mains flow scheduling valve is movable under an increase in pressure in the servo line relative to the mains fuel manifold to the closed pilot-only position.

In the second variant, the pilot fuel manifold (i.e. the first pilot fuel manifold in the case where the pilot fuel manifold comprises first and second manifolds) may be split into a primary line and the servo line such that each line receives a respective portion of the pilot fuel flow, the primary line directing flow to pilot discharge orifices of respective injectors of the combustor, and the servo line reuniting with the primary line after extending to the mains flow scheduling valves.

The splitting unit can include a fuel flow splitting valve, e.g. of the type disclosed in US 2016/0273775. Thus such a valve can have a controllably slidable spool, the position of which determines a split of the metered total fuel flow into the valve between out-going pilot and mains fuel flows from the valve. A position sensor, such as an LVDT, on the fuel flow splitting valve can measure the position of the spool to determine the out-going pilot or mains fuel flow. Another option, however, is for the splitting unit to further include a fuel flow sensing valve downstream of the fuel flow splitting valve to sense the out-going pilot or mains fuel flow.

However, another option is for the splitting unit to implement a metering and spill architecture. In this case, the splitting unit may include a metering valve and a (further) spill valve, a first portion of the total metered fuel flow received by the splitting unit being an inflow to the metering valve and a second portion of the total metered fuel flow received by the splitting unit being an inflow to the spill valve, the metering valve being configured to controllably determine a fuel flow rate of a metered outflow formed from the first portion of the total metered fuel flow, the spill valve being configured to produce a spilled outflow formed from the second portion of the total metered fuel flow, and the spill valve being further configured to sense a pressure differential between the inflow to and the metered outflow from the metering valve and to vary the amount of the spilled outflow in response to the sensed pressure differential, whereby the metered outflow forms one of the pilot and mains fuel flows, and the spilled outflow forms the other of the pilot and mains fuel flows. Advantageously, the metering valve and the spill valve of the splitting unit can provide purely hydro-mechanical closed loop control of the fuel split. The higher bandwidth of this form of control facilitates more accurate dynamic control of fuel flow to the engine. The use of such a splitting architecture can also reduce the sensitivity of the fuel split to changes in the flow characteristics of downstream components, such as the burner nozzles, which may block progressively over time.

Preferably, when the splitting unit implements the metering and spill architecture, the metered outflow forms the mains fuel flow, and the spilled outflow forms the pilot fuel flow. This allows the mains fuel flow to be controlled more accurately, which can be particularly beneficial for control of a cooling flow (discussed below) when mains is de-staged. This does not exclude, however, that the metered outflow can form the pilot fuel flow, and the spilled outflow can form the mains fuel flow.

When the splitting unit implements the metering and spill architecture, the metering valve may have a spool whose position is controllable to determine the fuel flow rate of the metered outflow. For example, the position of the spool may be controlled by a servo-valve, e.g. under the command of the engine electronic controller. The metering valve may further have a device to measure the position of the spool. This position measurement can be fed to the engine electronic controller for use in controlling the spool position.

Irrespective of its architecture, the splitting unit may send a cooling flow to the mains fuel manifold during pilot-only operation. In this case, the system may further have a mains cooling valve which, during pilot-only operation, opens a bypass connection between the mains and pilot fuel manifolds such that the cooling flow passes from the mains fuel manifold to the pilot fuel manifold. The cooling flow through the mains fuel manifold in the pilot-only mode then helps to avoid coking in the mains manifold when the mains flow control valves are in their pilot-only positions. Advantageously, the cooling flow can pass to pilot discharge orifices of the injectors for burning in the combustor, avoiding the need for any kind of recirculation architecture and thereby reducing fuel heating and residence time so that the possibility of fuel breakdown is reduced. Preferably, the mains cooling valve is hydraulically operated by the pressure in the servo line relative to the pressure in the mains fuel manifold, or more specifically (in the case of the first variant discussed above) relative to the pressure in the primary line of the mains fuel manifold. For example, when the servo pump operates to increase the pressure in the servo line relative to the pressure in the mains fuel manifold/primary line, the increased pressure in the servo line may open the mains cooling valve such that the cooling flow passes from the mains fuel manifold to the pilot fuel manifold.

When the combustion staging system has the mains cooling valve, the system may further have a non-return valve in the bypass connection which prevents flow in the direction from the pilot fuel manifold to the mains fuel manifold.

When the splitting unit implements the metering and spill architecture, according to one option for the cooling flow, the spill valve of the splitting unit can send the cooling flow to the mains fuel manifold during pilot-only operation. In particular, the spill valve may receive a third portion of the total metered fuel flow (e.g. through a fixed servo orifice) and may form the cooling flow therefrom. However, according to another option (particularly applicable when the metered outflow forms the mains fuel flow) the metering valve may send the cooling flow to the mains fuel manifold during pilot-only operation. Yet another option is for the spill valve of the splitting unit to send part of the cooling flow, and the metering valve to send the other part.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 2:
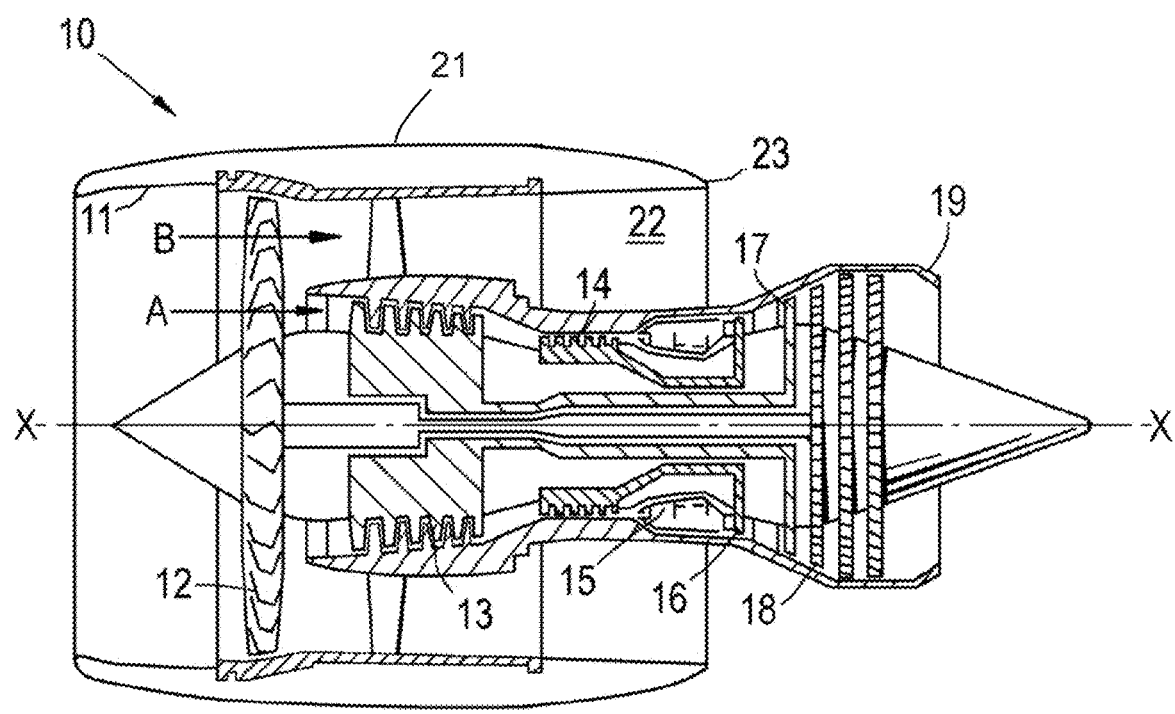
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts. Although FIG. 2 shows a three spool turbofan engine, the present invention is equally applicable to other engine architectures, such as two or single spool engines, and/or geared fan engines.

The engine has a pumping unit comprising a low pressure (LP) pumping stage which draws fuel from a fuel tank of the aircraft and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox. Between the LP and the HP stages the fuel is typically heated in a fuel/oil heat exchanger (FOHE) and filtered to remove contaminants and ice.

A fuel supply system then accepts fuel from the HP pumping stage for feeds to the combustor 15 of the engine 10. This system typically has a hydro-mechanical unit (HMU) comprising a fuel metering valve operable to control the rate at which fuel is allowed to flow to the combustor. The HMU may further comprise a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof in a filtered servo flow for correct operation of any fuel pressure operated auxiliary devices (such variable inlet guide vane or variable stator vane actuators) that receive fuel under pressure from the HMU. Further details of such an HMU are described in EP A 2339147.

An engine electronic controller (EEC—not shown) commands the HMU fuel metering valve to supply fuel at a given flow rate to a staging system 30 (shown schematically in FIG. 3 in pilot+mains operation mode, and in FIG. 4 in pilot-only operation mode) and thence to fuel injectors 34 of the combustor 15. The metered total fuel flow leaves the HMU and arrives at the staging system at a pressure $P_{fmu}$.

Figure 1:
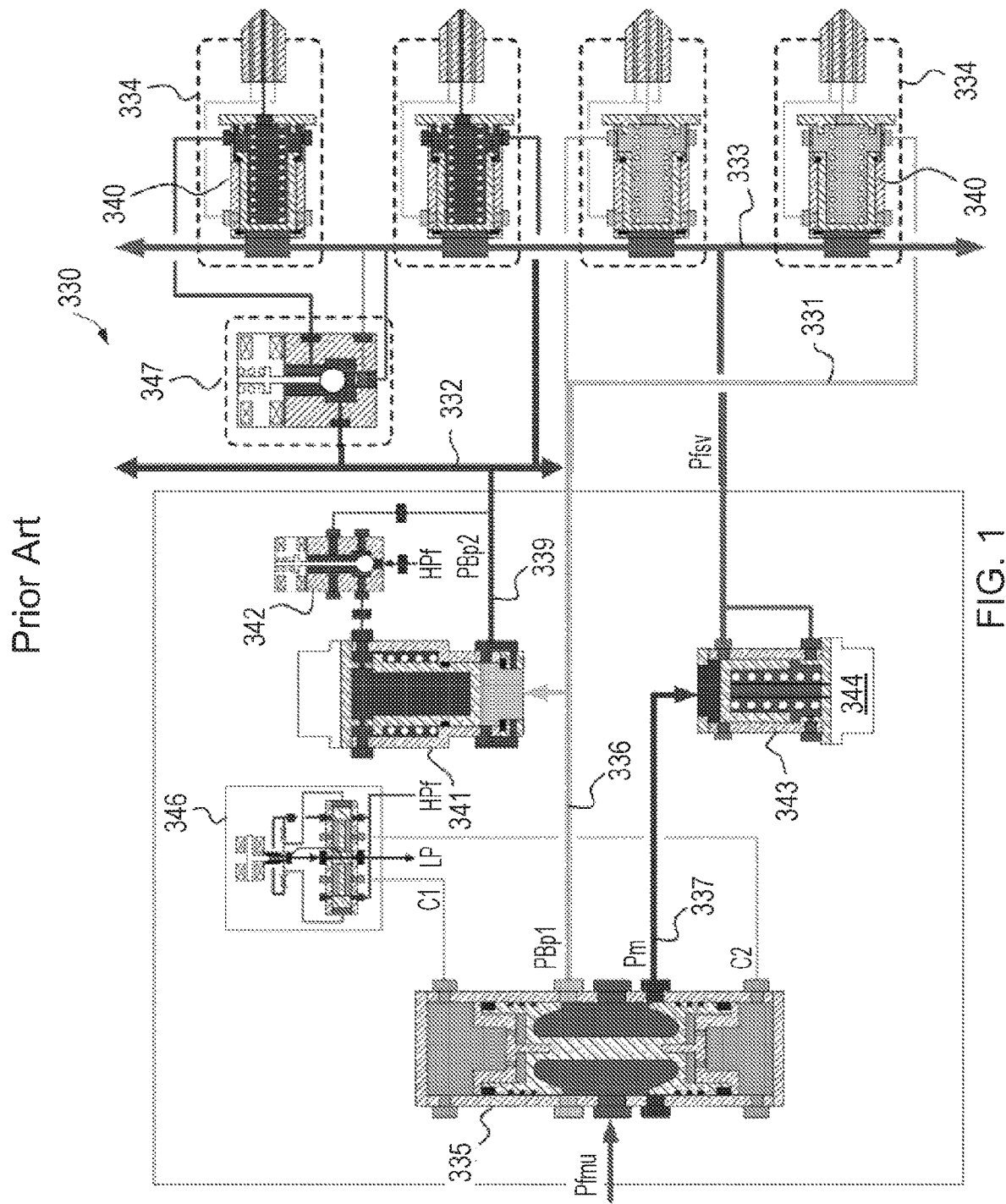
FIG. 1 shows schematically a known staging system for fuel injectors of the combustor of a gas turbine engine of FIG. 1 in pilot-only operating mode.

Parts of the staging system 30 are similar or identical to the corresponding parts of the known system 330 shown in FIG. 1. Thus the staging system 30 splits the fuel under the control of the EEC into two flows: one for first 31 and second 32 pilot manifolds and the other for a mains manifold 33. The first pilot manifold feeds pilot discharge orifices of a subset of the fuel injectors (via respective weight distribution valves—WDVs). The second pilot manifold feeds pilot discharge orifices of the rest of the fuel injectors (also via respective WDVs). The mains manifold feeds mains discharge orifices of all the fuel injectors. A splitting unit 50 (described in more detail below) receives the metered total fuel flow from the HMU and produces an outgoing flow split between a pilot connection pipe 36 which delivers fuel to the first 31 and second 32 pilot manifolds and a mains connection pipe 37 which delivers fuel to the mains manifold 33. The second pilot manifold 32 connects to the pilot connection pipe 36 via a further connection pipe 39 and a lean blow out protection valve 41 controlled by way of a solenoid-operated control valve 42. The splitting unit also sends a cooling flow to the mains manifold during pilot-only operation.

The system 30 has a mains cooling valve 47 which in pilot-only operation opens a bypass connection between the mains manifold 33 and the connection pipe 36, allowing the cooling flow sent to the mains manifold 33 during pilot-only operation to pass from the mains fuel manifold to the pilot fuel manifolds, and thence onwards for burning at the pilot orifices of the injectors 34. The mains cooling valve 47 closes during pilot-and-mains operation.

Figure 3:
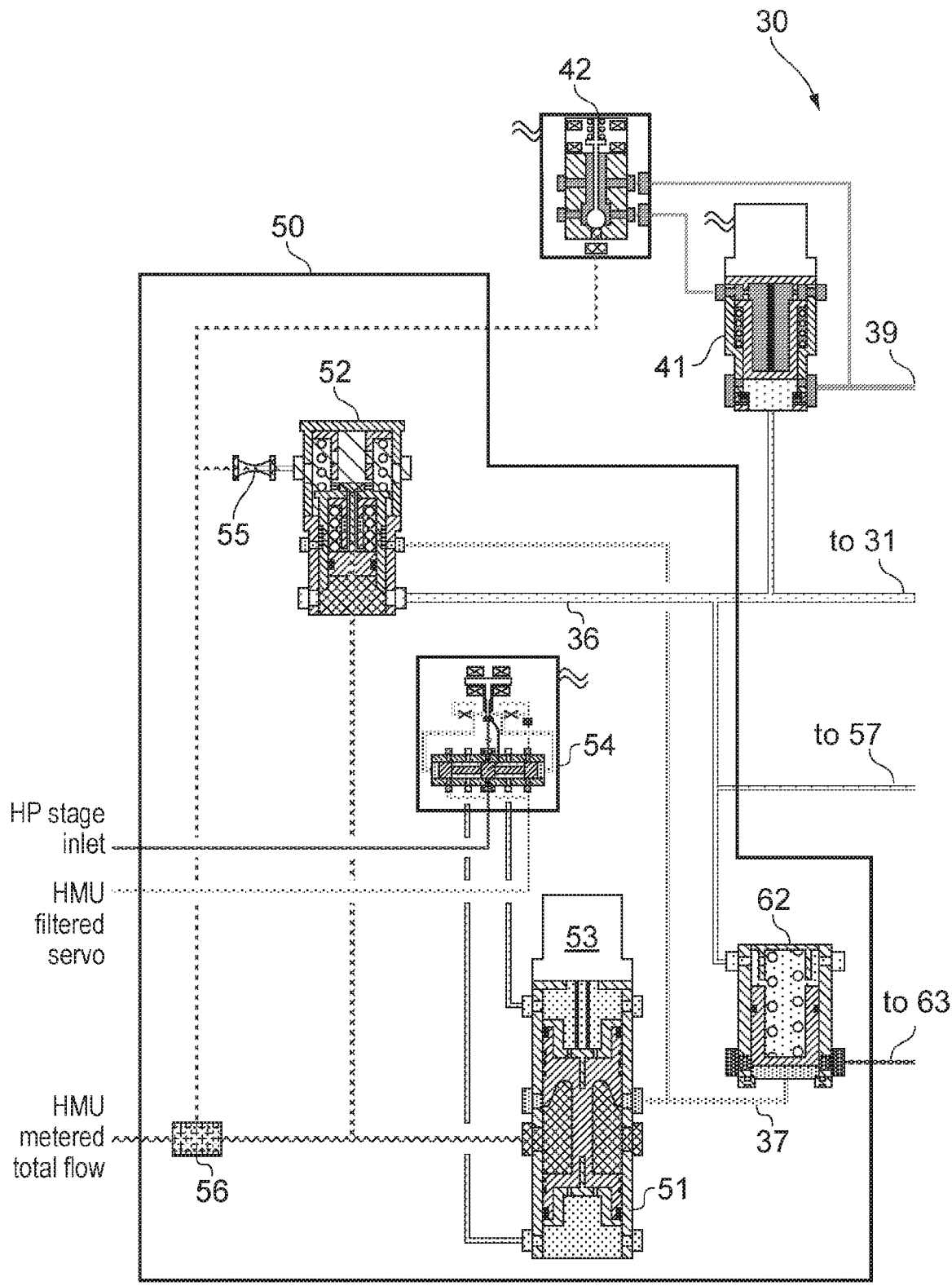
FIG. 3 shows schematically a staging system for fuel injectors of the combustor of the engine of FIG. 2 in pilot+mains operation mode.
Figure 3:
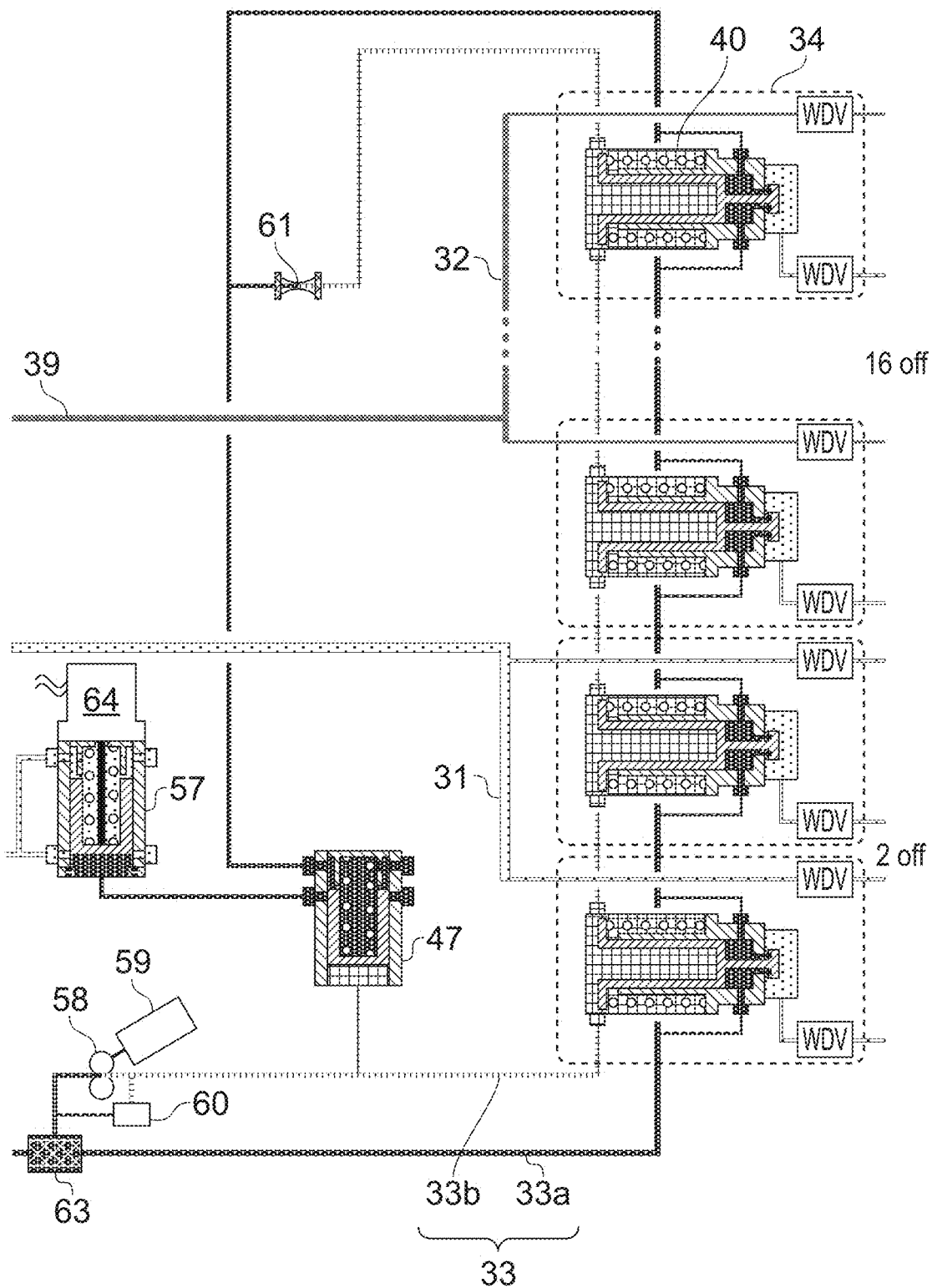
Figure 4:
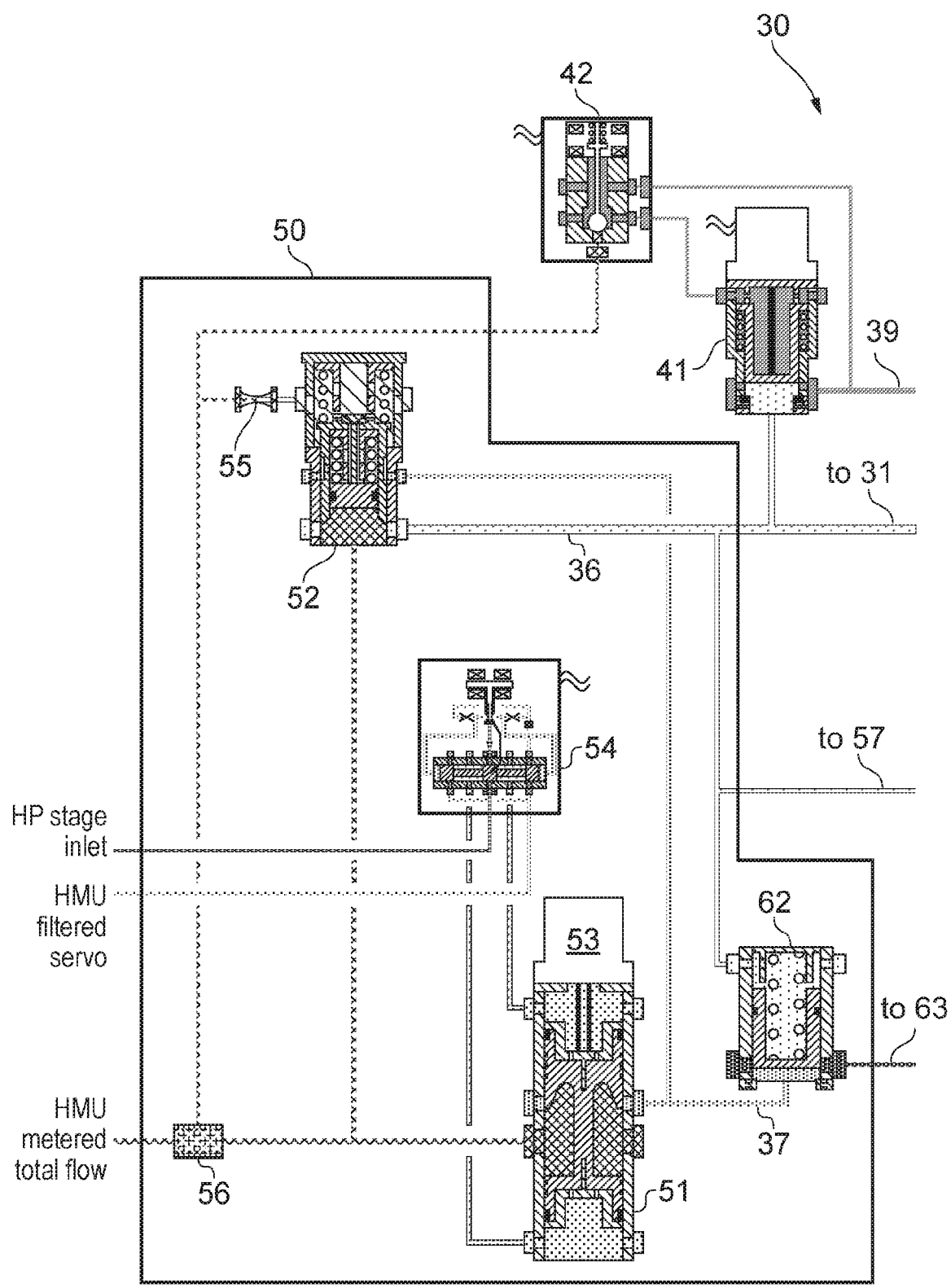
FIG. 4 shows schematically the staging system of FIG. 3 in pilot-only operation mode.
Figure 4:
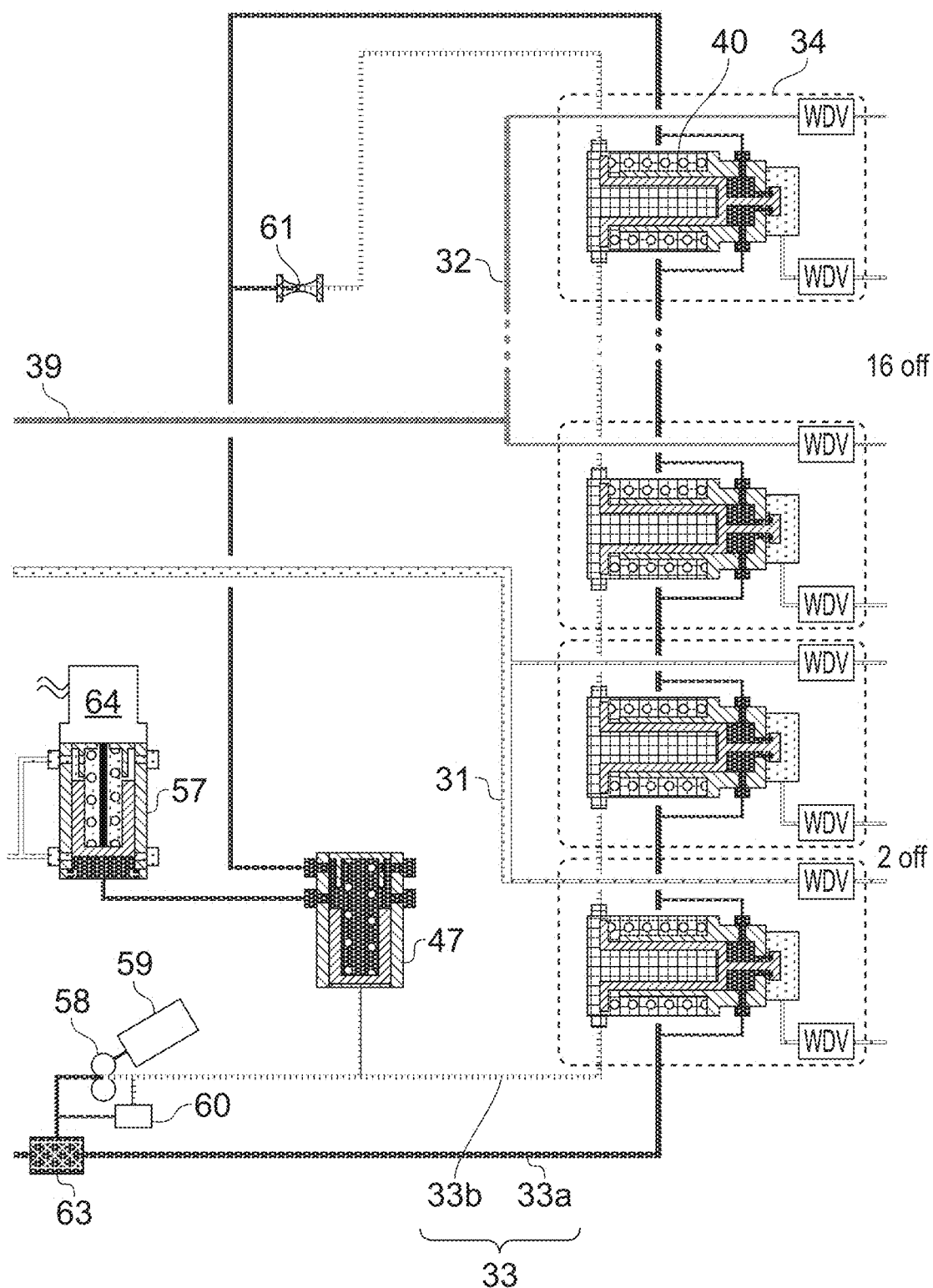

A difference between the staging system 30 shown in FIGS. 3 and 4 and the known system 330 shown in FIG. 1 is that mains flow control valves 40 are provided at the injectors 34 rather than mains FSVs. Moreover, the mains fuel manifold 33 is split into a primary line 33a and a servo line 33b which each receive a respective portion of the mains fuel flow. The mains flow control valves 40 distribute the mains flow from the primary line to the mains discharge orifices in the injectors 34 via respective WDVs, and the operation of the mains flow control valves is controlled by a pressure differential between the primary and the servo lines. This arrangement is discussed further below after a more detailed discussion of the splitting unit 50.

A further difference between the staging system 30 shown in FIGS. 3 and 4 and the known system 330 shown in FIG. 1 is that the splitting unit 50 has a fuel flow metering and spill architecture rather than a fuel flow splitting valve and a fuel flow sensing valve. However, although the metering and spill architecture provides advantages, which are discussed below, an architecture based on a fuel flow splitting valve could be implemented instead.

More particularly, the splitting unit 50 has a staging metering valve (SMV) 51 providing a variable metering orifice with a known, and accurately controlled, relationship between area and metering spool position. Control of the position of the spool of the SMV allows control of the metering orifice area. The position of the metering piston is measured using a position sensor, such as an LVDT 53, and its position is controlled using a two stage servo-valve (MSV) 54. A spill valve (SSV) 52 of the splitting unit 50 controls the pressure differential set across the metering orifice such that control of metering valve position gives accurate control of flow delivered by the SMV into the mains connection pipe 37, this flow being the mains fuel flow sent to the mains manifold 33.

However, the fuel flow delivered through the SMV 51 is only a first portion of the HMU total metered fuel flow received by the splitting unit 50. A second portion of the received total metered fuel flow passes through a staging spill valve (SSV) 52 into the pilot connection pipe 36 to form the pilot fuel flow. The SSV can be a two-stage valve, with a pilot (first) stage of the SSV sensing the pressure differential set across the SMV and varying the position of a second stage piston to vary the area of the spill profile in a valve sleeve. Similarly, the SSV can be a single stage valve with a single piston both sensing the pressure differential set across the SMV and moving to vary the area of the spill profile. Opening the spill profile of the SSV permits more spill flow to pass to the pilot connection pipe and thus reduces the mains fuel flow from the SMV (as the mains flow+the pilot flow=HMU total metered fuel flow). The converse is true for SSV closure.

An advantage of the fuel flow metering and spill architecture of the splitting unit 50 is that control of the pressure drop across the SMV 51 can be achieved hydro-mechanically and is therefore capable of a significantly higher bandwidth than can be achieved with the control arrangement outlined in US 2016/0273775. More accurate control of mains flow during transients can thus be achieved, such as when the metered total fuel flow is changing, flow split is changing, or mains is being staged-in or out. Transient dips and spikes in fuel flow risk engine surge or flameout, so their reduction is important.

The SMV 51 is used to meter flow to the mains connection pipe 37 when mains is both staged-in or staged-out. In the latter case, a residual metered flow from the SMV can be used to form the cooling flow sent to the mains manifold 33 during pilot-only operation. For example, when the spool of the SMV moves into a position corresponding to pilot-only operation (FIG. 4) it could open an additional port on the SMV (not shown in FIG. 4) to open the cooling flow path. However, as shown in FIG. 4, another option is for the two-stage SSV 52 to meter a fixed flow in parallel to the SMV metering orifice. This flow is formed from a third portion of the received total metered fuel flow and is taken from a flow washed filter (SFWF) 56 at the inlet to the splitting unit 50. It then passes through a fixed servo orifice (SSO) 55 before passing through a variable poppet orifice within the SSV into the mains connection pipe downstream of the SMV. The rate of this fixed flow can be aligned with the cooling flow required to cool the mains manifold, allowing the SMV to be fully closed in pilot-only operation. This arrangement advantageously reduces the risk of excessive cooling flows resulting from any SMV control problems. In particular, such excessive cooling flows can increase the risk of undesired opening of the mains flow control valves 40. The two-stage SSV is also more robust than a single-stage spill valve to fuel borne contamination and coking, and thus provides better control of flow splitting between pilots and mains, which in turns offers better control of engine emissions. However, this does not exclude that the splitting unit could use a single-stage SSV instead of the two-stage SSV shown.

The metering and spill architecture of the splitting unit 50 is made possible by the need to maintain flow in the both the pilot manifolds 31, 32 and the mains manifold 33 when the engine is running. In pilots-only mode of operation, cooling flow is metered into the mains manifold for cooling purposes and re-joins the pilots burnt flow stream via the mains cooling valve 47.

A non-return valve 57 can be added to the bypass connection controlled by the mains cooling valve 47 between the pilot manifolds 31, 32 and the mains manifold 33. The non-return valve accommodates a scenario where one of the mains flow control valves 40 has failed open when mains is staged-out. Without the non-return valve it would be possible for pilot flow to pass to the mains manifold. This flow would increase as the pressure differential across the pilot discharge orifices of the fuel injectors increases. Passing to the mains combustion zone through the failed mains flow control valve, the flow could result in localised heating of turbine components, leading to a reduction of turbine life and possible turbine failure.

The operation of the mains cooling valve 47 and the non-return valve 57 is explained further below as part of the discussion of the mains flow control valves 40 and the split mains fuel manifold 33.

As mentioned above, the staging system 30 includes a lean blow out protection valve (LBOV) 41 controlled by way of a solenoid-operated control valve (LBSV) 42. The high pressure feed for the LBSV can be configured to be taken from the SFWF 56 at the inlet to the splitting unit 50. Any leakage flow from this feed then returns to the second pilot manifold 32 via the connection pipe 39. Benefits of such a servo supply for the LBOV are:
1. The leakage into the second pilot manifold 32 when the engine is running is part of the HMU metered total fuel flow, reducing the potential for delivery of incorrect flow levels to the engine.
2. When the engine is shut-down, fuel cannot leak into the staging system 30 via the LBOV 41. In the staging system 330 of FIG. 1, such leakage from HPf is possible if the seal of the solenoid operated control valve 342 is not drip tight when its plunger is in the position shown in FIG. 1.

It would be possible to configure the splitting unit 50 such that the metered flow stream from the SMV 51 is directed to the pilot connection pipe 36 to form the pilot fuel flow and the mains flow is formed from the remaining spill through the SSV 52. However, in this case the spill through the SSV 52 would need to be controlled quite accurately to produce the cooling flow when mains is staged-out. Metering the pilot flow means that the residual mains flow is the difference between the HMU metered total flow and metered pilot flow. Inaccuracies in metering either of these flows could result in too wide a range of cooling flows. In particular, too low a cooling flow could cause excessive fuel temperatures in the de-staged mains line, while too high a cooling flow could risk opening the FSVs 40 as a result of an excessive pressure differential between mains and pilot when mains is de-staged.

We turn next to consideration of the mains flow control valves 40 and the split mains fuel manifold 33. Conveniently, the mains flow control valves can be binary operated valves which permit or stop the delivery of metered mains flow to the mains combustion zone for burning. Closure of the mains flow control valves stops the mains flow to the combustor (de-staging), while opening of the valves allows mains flow (staging). Binary operation is caused by application or removal of a pressure differential applied to each binary valve and generated by a staging servo pump (SSP) 58 located in the servo line 33b of the mains fuel manifold and powered by a hydraulic motor 59. The motive fluid for the motor is pressurised fuel obtained from the output of the HP pumping stage. The SSP and the hydraulic motor form a motor and pump unit, described below in more detail in respect of FIGS. 5 to 9.

As shown in FIGS. 3 and 4, the mains fuel manifold is split into the primary 33a and servo 33b lines at a cooling flow washed filter (CFWF) 63. The SSP 58 can be a gear-type positive displacement pump which draws flow through the CFWF into the servo line. Both the primary and the servo lines extend through each mains flow control valve 40 in series, before reuniting downstream of a back pressure orifice (BPO) 61. Thus the portion of the mains flow diverted through the servo line ultimately returns to the primary line for burning. The BPO provides a restriction to flow that generates a pressure differential across the SSP.

The mains flow control valves 40 each have a chamber containing a movable, spring-biased piston, with the chamber to a servo (spring) side of the piston being in fluid communication with the servo line 33b and the chamber to a primary (non-spring) side of the piston being in fluid communication with the primary line 33a. With a faster pump speed of the SSP 58, a higher pressure differential can be generated across the pistons. A high pressure differential overcomes a closing spring bias acting on the pistons, such that the valves open for staging. Removal of the differential allows the spring bias to close the valves.

Advantageously, the mains flow control valves 40 can have single face seals, rather than the dual face seals of the FSVs 340 of the system of FIG. 1, as some leakage between the primary 33a and servo 33b lines in the valves is acceptable.

As the mains flow control valves 40 are binary operated valves which do not rely on the pressure of the pilot flow, they do not allow the pilot flow to throttle the mains flow in the manner of the FSVs 340 of the system of FIG. 1 and without this throttling function it can be difficult to achieve the required range of pilot to mains flow splits. Accordingly, a mains throttle valve 62 can be provided in the splitting unit 50 to displace flow in a similar way to the FSVs 340. However, as the mains throttle valve is a single valve its net displacement area can be significantly smaller than that of the FSVs 340, which can help to reduce dynamic cross-talk between the pilot and mains flows.

The velocity of opening of the mains flow control valves 40 is determined by: the force balance on their pistons, the size of the restriction of the BPO 61 and the flow made available from the SSP 58. In contrast, the velocity of closing of the mains flow control valves is determined from their force balance and the size of the BPO restriction alone, since the pump speed is reduced (e.g. to zero) when de-staging. Advantageously, the system can effect transition of the mains flow control valves from one end to another in around one second.

Although the SSP 58 is illustrated in FIGS. 3 and 4 as a gear pump, any type of positive displacement pump can be used to generate the servo differential pressure. Thus the SSP could be an external gear pinion pump, an internal gear pinion pump, a vane pump or a piston pump. As another option, a roto-dynamic pump, such as a centrifugal pump could be used to generate the differential pressure.

The binary operating mains flow control valves 40 can improve the robustness of the staging system 30, and reduce the possibility of undesirable operation. In particular, one of the problems with FSVs 340 shown in FIG. 1, is the effect of one FSV failing open. At low metered flows, a tendency is for the majority of the flow to pass through the failed-open valve. The remainder of the FSVs would be less open or closed and pass less flow, creating a local hot spot in the engine, which can elevate turbine temperature to the point where turbine integrity is lost or turbine life is significantly reduced. This can be avoided, however, in the staging system 30 of FIGS. 3 and 4, by having the normally open position of the mains flow control valves 40 equal to the position of a failed-open valve.

A further benefit of the binary operating mains flow control valves 40 is their reduced sensitivity to variation in friction (from differences in build, wear, and debris contamination) acting on the piston of each valve. For the FSVs 340 shown in FIG. 1, this variation results in degradation in flow split between burners, affecting combustion emissions and potentially creating turbine hot spots as above. The mains flow control valves 40, by contrast, can tolerate significantly higher frictional loads before their operation is affected.

After completion of de-staging, the SSP 58 can be run at a slow speed such that some of the cooling flow generated by the splitting unit 50 (as discussed above) is sent through the servo line 33b as well as through the primary line 33a. The relative amounts of the cooling flows through the lines can be managed by appropriate control of pump speed informed by measurement of servo pressure differential between lines 33b and 33a or flow rate in the servo line 33b.

A position sensor, e.g. in the form of an LVDT 64, on the non-return valve 57 can be used to provide flow measurement and thereby identify the occurrence of a mains flow control valve 40 that has failed in an open position when required to be closed. The EEC can then take suitable action to end the delivery of the cooling flow by ceasing the delivery of total flow to the staging unit or staging in mains to maintain delivery of engine power, albeit at the expense undesired engine emissions. More particularly, if a mains flow control valve fails in an open position when it should be closed, the subsequent leakage of cooling flow to the combustion process results in a lower pressure in the mains fuel manifold 33 than in the pilot fuel manifolds 31, 32. This then causes the non-return valve to close when it should be open, thereby announcing the failure.

The mains cooling valve 347 in the system of FIG. 1 is solenoid operated and located relatively close to the injectors 334. In contrast, the mains cooling valve 47 in the staging system 30 of FIGS. 3 and 4, is closer to the splitting unit 50 and is hydraulically operated on the basis of the pressure differential between the primary 33a and the servo 33b lines. These changes improve the robustness of the mains cooling valve. Firstly, the location of the valve allows its relatively small cooling orifice to reside in an environment where temperature can be better controlled, reducing a risk of blockage due to build-up of fuel breakdown products. Secondly, the hydraulic operation allows the valve to operate with larger forces than solenoid operation, enabling a more robust valve structure.

A relief valve 60 connected across the SSP 58 can be provided to limit pressures in the servo line 33b in the event of blockage of the BPO 61. However, this relief function can be provided through limitation of input power to drive the SSP if the pump speed is measured.

Further variants of the combustion staging system shown in FIGS. 3 and 4 are possible. For example:

1) The mains flow control valves 40 can be configured to operate at different pressure differentials so as to provide a means of staging mains. As an example, half of the total number of the valves could use a higher spring load than the other half, such that operation of the SSP 58 could be used to open half the valves before the remainder open. This increases the minimum flow passing through any one mains flow control valve to the corresponding mains discharge orifice, thus avoiding potential issues of degraded operation resulting from undesirable flow regimes within the nozzle assembly of the injectors at low flows.

2) A differential pressure sensor could be provided to sense the pressure differential generated by the SSP 58 such that closed loop control can be used to more accurately regulate the differential generated by the SSP. The loop could be closed by the EEC, with pump speed being varied to change delivered differential. Accurate regulation of multiple pressure levels could be beneficial to achieve mains staging.

3) Sensing of the differential pressure between the mains and pilot flows can be used to diagnose a mains flow control valve 40 in a failed open state when mains is staged-out. Such pressure sensing can be an alternative to the measurement provided by the LVDT 64 of the non-return valve 57.

4) The staging system could use a splitting unit based on a fuel flow splitting valve (FFSV) of the type shown in FIG. 1 in place of the metering and spill architecture of the splitting unit 50 of FIGS. 3 and 4.

Figure 5:
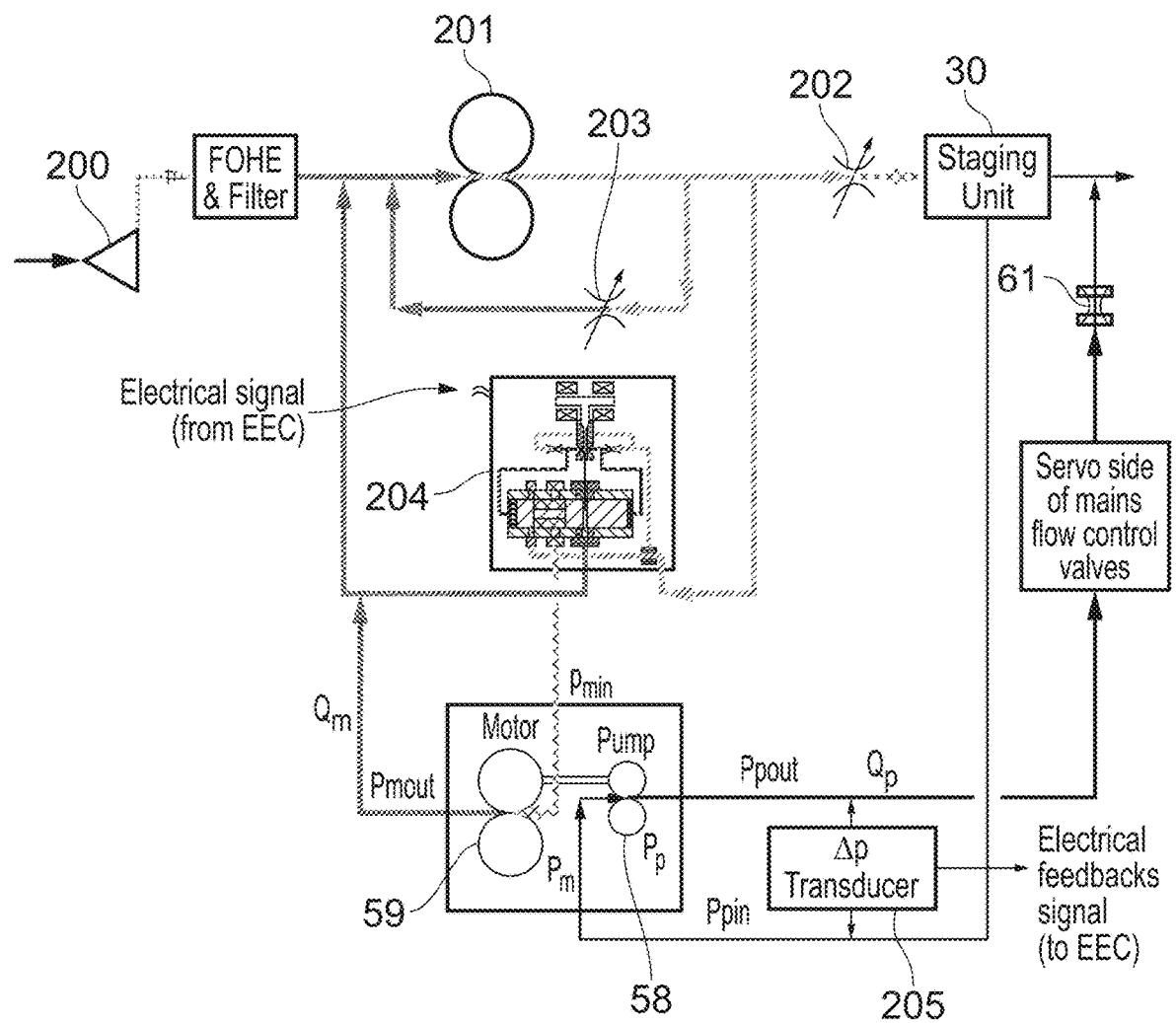
FIG. 5 shows schematically a staging servo pump and associated hydraulic motor in the context of a pumping unit and a fuel supply system including the staging system of FIGS. 3 and 4.

We turn next to the motor and pump unit formed by the SSP 58 and the hydraulic motor 59. FIG. 5 shows schematically the motor and pump unit in the context of the engine's pumping unit comprising the LP pumping stage 200 and the HP pumping stage 201 (shown as a single gear pump, but it could be e.g. a dual gear pump), the fuel metering valve 202 of the HMU, and the staging system 30.

The motive power for the hydraulic motor 59 is taken from the high pressure fuel output by the HP pumping stage 201, some of which is spilled back to low pressure through a spill valve 203 of the HMU. Thus some of the power that would otherwise be wasted as heat input into the fuel is used to drive the SSP 58 before being spilled back to low pressure. The motor can be, for example, an external gear pinion motor, an internal gear motor, a vane motor, a piston motor, an impulse motor or a reaction turbine. The motor and the SSP do not have to be of the same machine type.

A servo-valve 204 receives an input signal from the EEC to control communication between the pressurised fuel supply from the HP pumping stage 201 and the inlet of the hydraulic motor 59. For example, a two stage servo-valve can be provided for this function due to the magnitude of flows required to attain peak motor speed. The EEC generally requires a feedback signal to determine the control flow that should be ported to the hydraulic motor to ensure adequate flow/pressure is provided by the SSP 58. One option is to provide a differential pressure transducer 205 to sense the pressure difference between the inlet and the outlet of the SSP caused by passing flow pumped by the SSP through the BPO 61.

In more detail, the inlet pressure to the motor 59 ($P_{min}$) is throttled by a second stage of the servo-valve 204. The outlet pressure from the motor ($P_{mout}$) is connected directly to spill return. To be able to stop the motor relies upon the leakage flow that can pass through the servo-valve 204 from the high pressure (HP) output of the HP pump 201 to $P_{min}$ being significantly lower than the leakage that can pass from $P_{min}$ to $P_{mout}$ via the motor internal leakage paths. Leakage from HP to $P_{min}$ is reduced by configuring the second stage spool and sleeve porting of the servo-valve 204 such that, with the spool of the servo-valve in the rightmost position (as per FIG. 5), the connection between HP and $P_{min}$ via windows in the sleeve of the servovalve is closed off. A small, residual leakage flow from HP to $P_{min}$ occurs via the mated clearance between the spool and sleeve. $P_{min}$ thus drops to $P_{mout}$ when the servo-valve ports are closed. Under these conditions, the motor does not turn as the force available to operate it is now lower than that required to overcome frictional loads.

A control algorithm in the EEC compares the demanded pressure differential against the value fed back from the differential pressure transducer 205 and varies the electrical signal to the servo-valve 204 in order to vary pump speed such that a correct pressure differential is maintained. Two discrete pressure differential levels can be used to control the mains fuel control valves 40 shown in FIGS. 3 and 4. The EEC sets the demanded differential at the appropriate level depending on whether mains is required to be staged in or out.

As leakage from the pumped fuel circuit results in a reduction of metered flow sent to the injectors 34, the pumped fuel circuit is sealed from the motive fuel circuit. This sealing can be achieved using dynamic shaft seals, or by the use of a non-contacting drive such as a magnetic drive. Another option is to provide controlled leakage using labyrinth seals.

The hydraulic motor 59 and the SSP 58 provide a means of generating a servo pressure/flow that is independent of engine speed and uses waste energy that is available in the main engine burnt flow or actuator spill flow.

Figure 6:
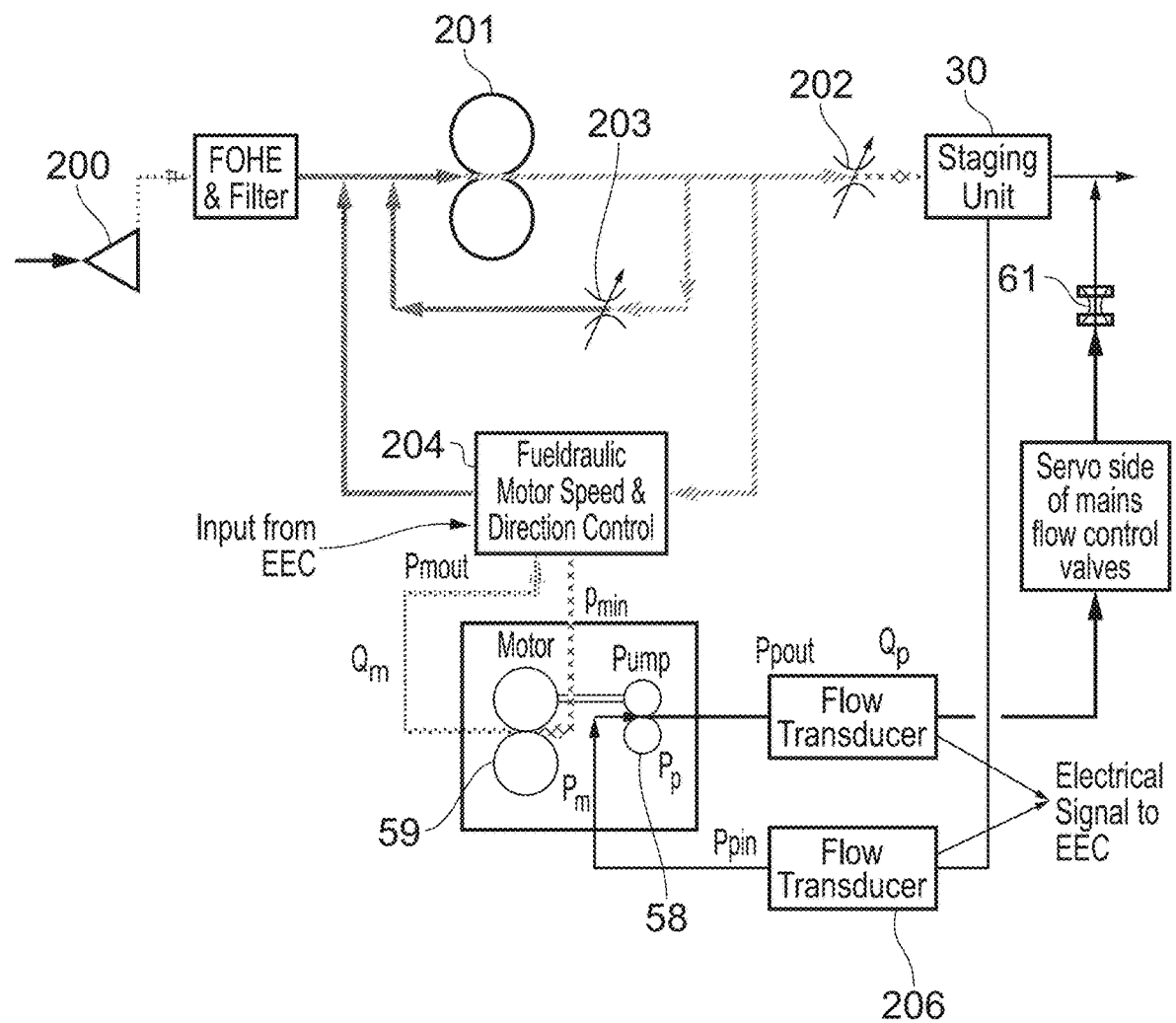
FIG. 6 shows schematically a variant staging servo pump and associated hydraulic motor.
Figure 7:
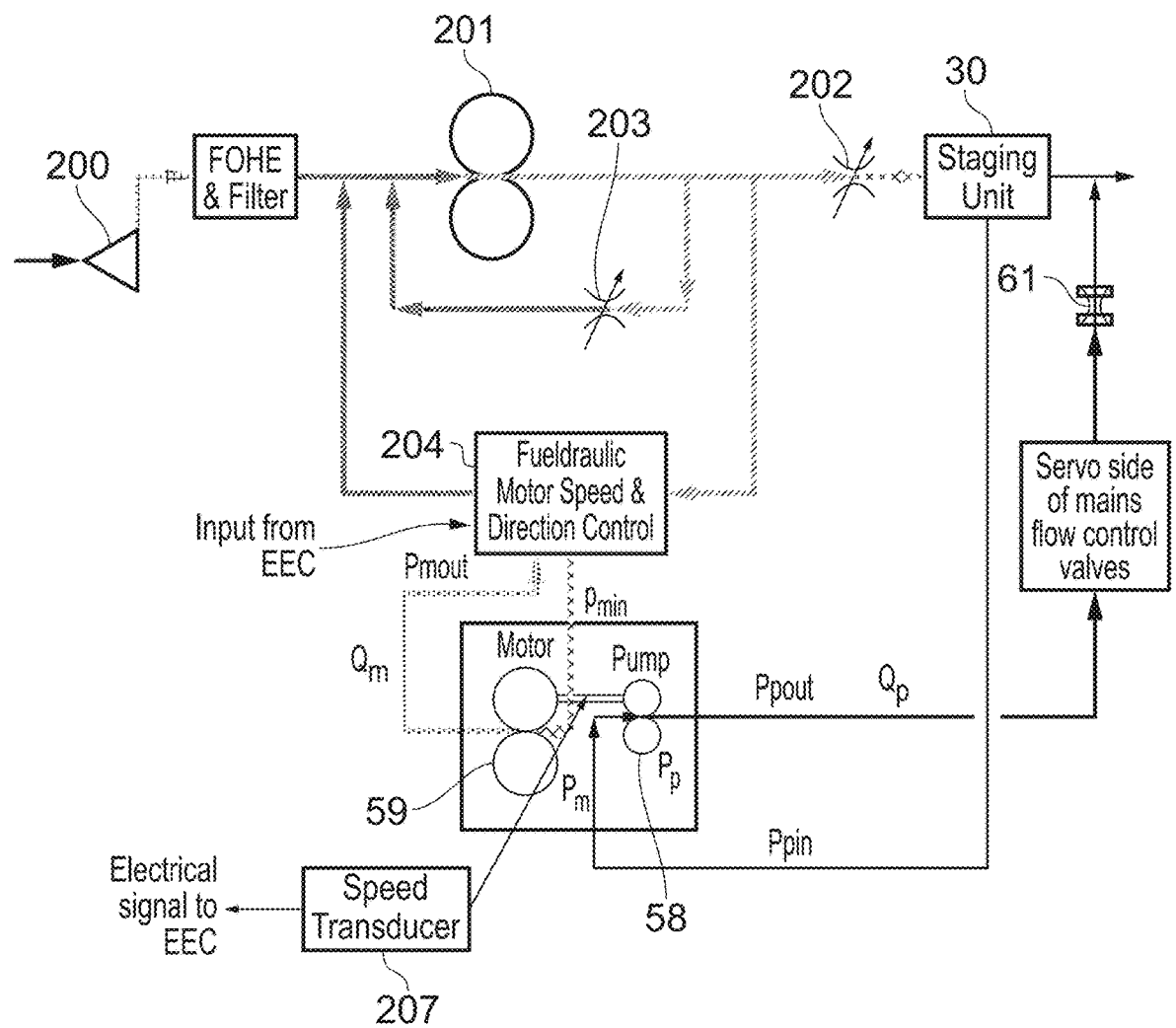
FIG. 7 shows schematically a further variant staging servo pump and associated hydraulic motor.

FIGS. 6 and 7 show respective variants of the motor and pump unit of FIG. 5. In FIG. 6, in place of the differential pressure transducer 205, a flow meter 206 on either the input line to or the output line from the SSP 58 provides a feedback signal to the EEC. In FIG. 7, in place of the differential pressure transducer 205, a rotary speed transducer 207 on either the SSP or the hydraulic motor 59 provides the feedback signal to the EEC.

Figure 8:
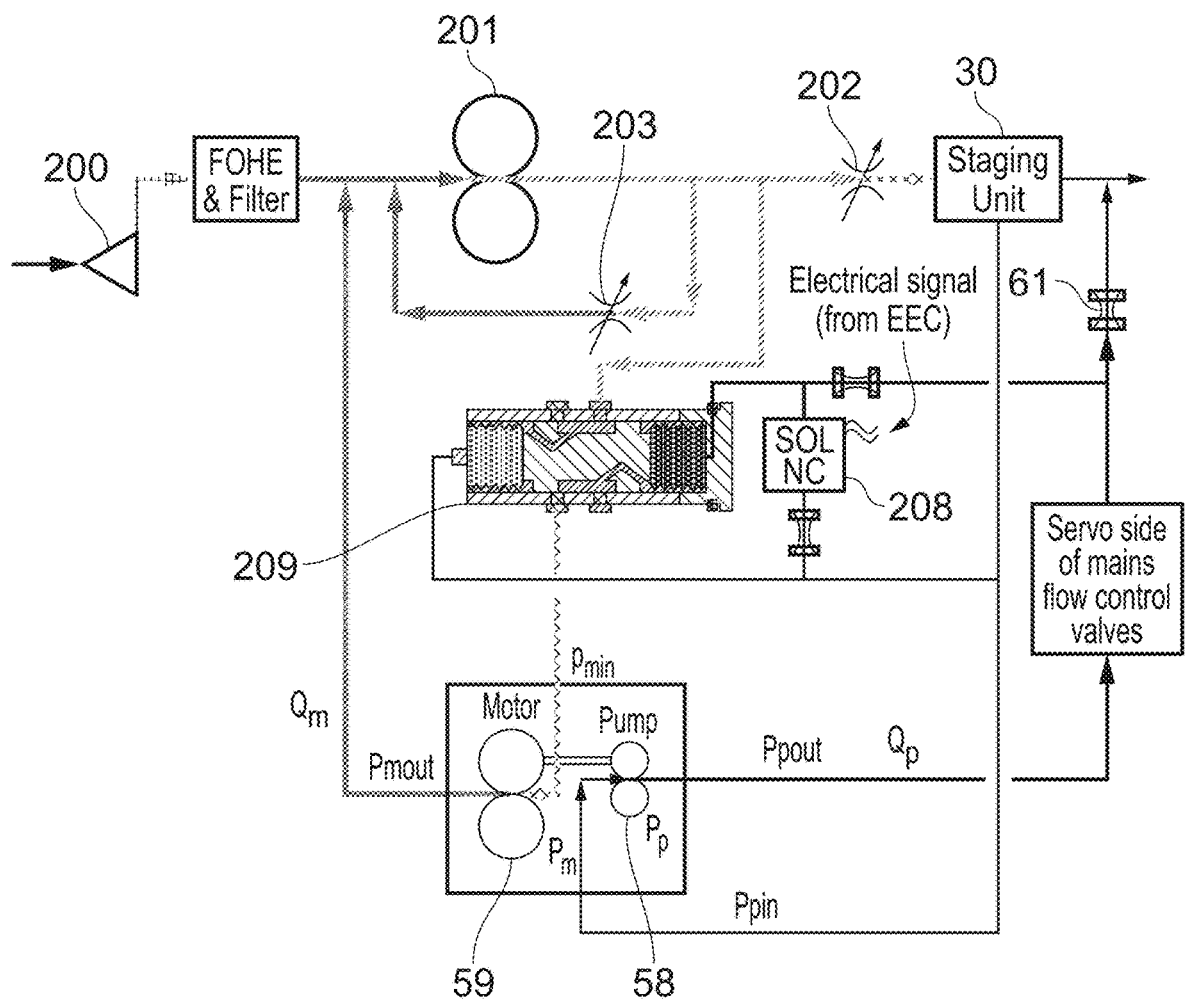
FIG. 8 shows schematically a further variant staging servo pump and associated hydraulic motor.

The speed control of the SSP 58 can be modified to allow closed loop hydraulic control of the differential pressure between the inlet and the outlet of the SSP. Thus direct hydraulic feedback can be used to position a valve rather than electrical feedback to the EEC. FIG. 8 provides an example of this type of control. In place of the servo-valve 204, a solenoid 208 or similar device actuates a throttle valve 209 to open or close the supply of pressurised fuel from the HP pumping stage 201 to the hydraulic motor 59. The solenoid is powered by the EEC to command the switching between the two servo pressure levels required for opening and closing the mains fuel control valves 40. More particularly, powering the solenoid increases the differential pressure regulated across the SSP to open the mains fuel control valves. Depowering the solenoid reduces the regulated differential, allowing the valves 40 to close. No feedback to the EEC is required.

Figure 9:
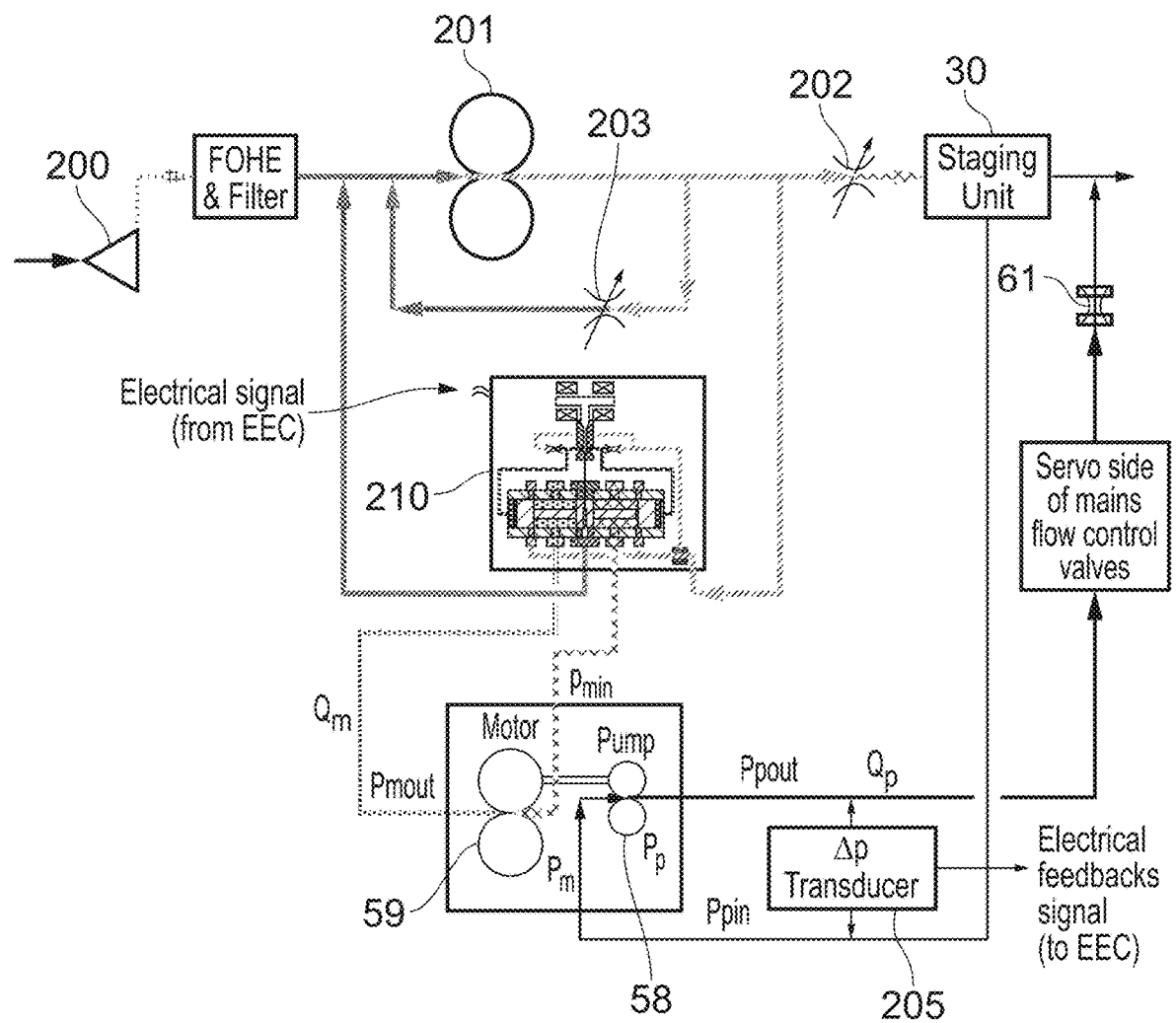
FIG. 9 shows schematically a further variant staging servo pump and associated hydraulic motor

For the staging system 30 shown in FIGS. 3 and 4, the motor 59 and the SSP 58 may be unidirectional or bidirectional. A bidirectional motor and pump arrangement can be achieved through the use of a valve arrangement that switches the ports that directs fuel to and receives fuel from the hydraulic motor 59. FIG. 9 shows, for example, a motor and pump unit which, like the unit of FIG. 5, has a servo-valve 210 controlled by feedback from a differential pressure transducer 205. However, in this case, the servo-valve 210 can be commanded to switch the motor ports. Thus the servo-valve 210 modulates communication not only between HP and $P_{min}$, but also between $P_{mout}$ and the low pressure (LP) input to the HP pump 201, HP and $P_{mout}$, and $P_{mout}$ and LP.

Running the motor 59 and the SSP 58 in reverse can help augment the closing force margin of the mains flow control valves 40 at the burner head by reducing the pressure in the servo line 33b to a value below the pressure in the primary line 33a. The reversed pressure differential augments the spring force available to close the valves. The valves can then be made smaller as a result of the smaller spring load.

In FIGS. 5 to 9, the motive power for the hydraulic motor 59 is taken from the high pressure fuel output by the HP pumping stage 201. This does not exclude, however, that other hydraulic power fuel sources could be used. For example, EP A 2891781 describes an augmenter pump used to deliver pressurised fuel to one or more fuel-pressure operated auxiliary engine devices. The augmenter pump operates in parallel to an HP pumping stage, with an inlet of the augmenter pump receiving the same LP input as the HP pumping stage. Such an augmenter pump could provide the motive power for the hydraulic motor 59.

Figure 10:
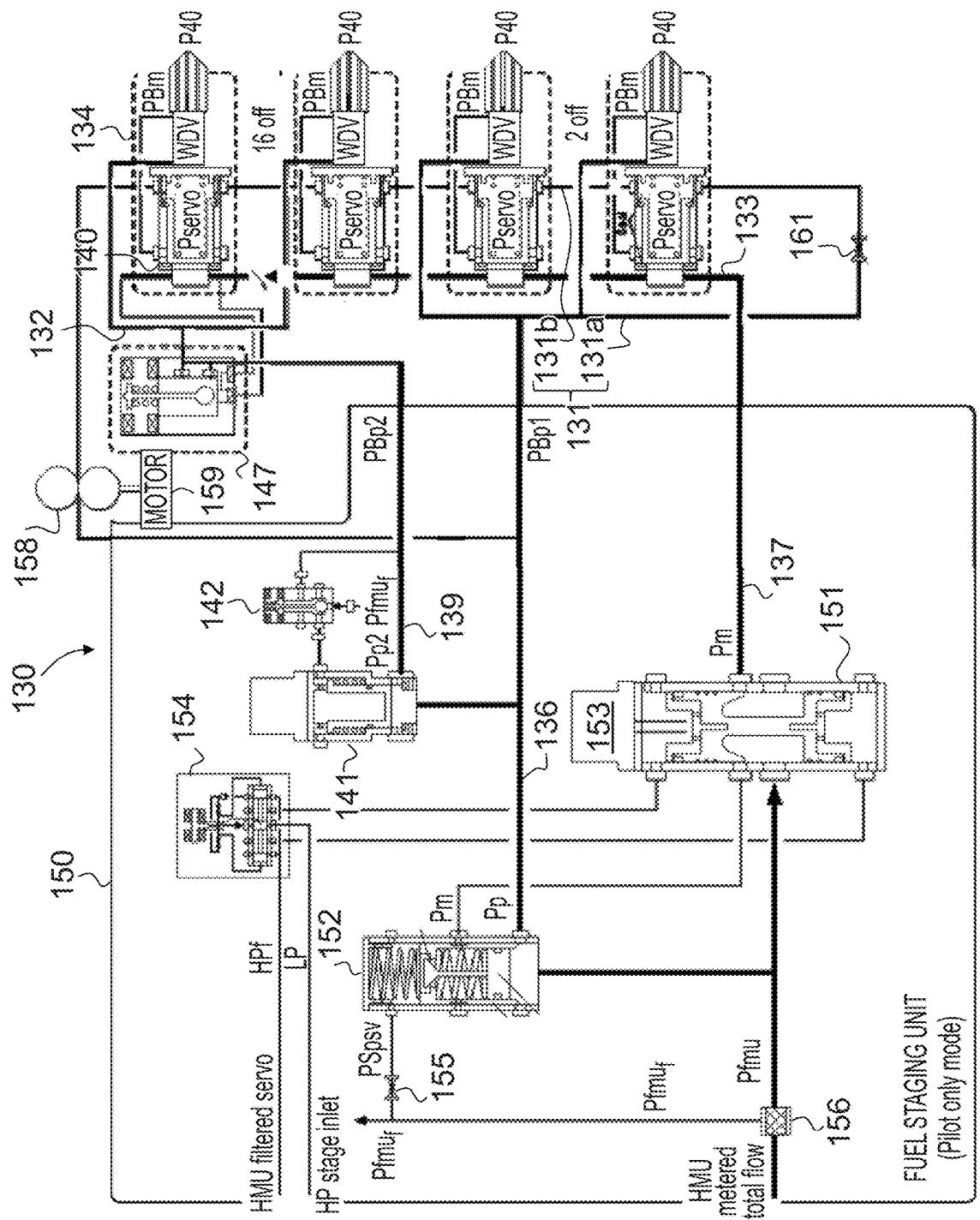
FIG. 10 shows schematically a further staging system for fuel injectors of the combustor of the engine of FIG. 2 in pilot-only operation mode.
Figure 11:
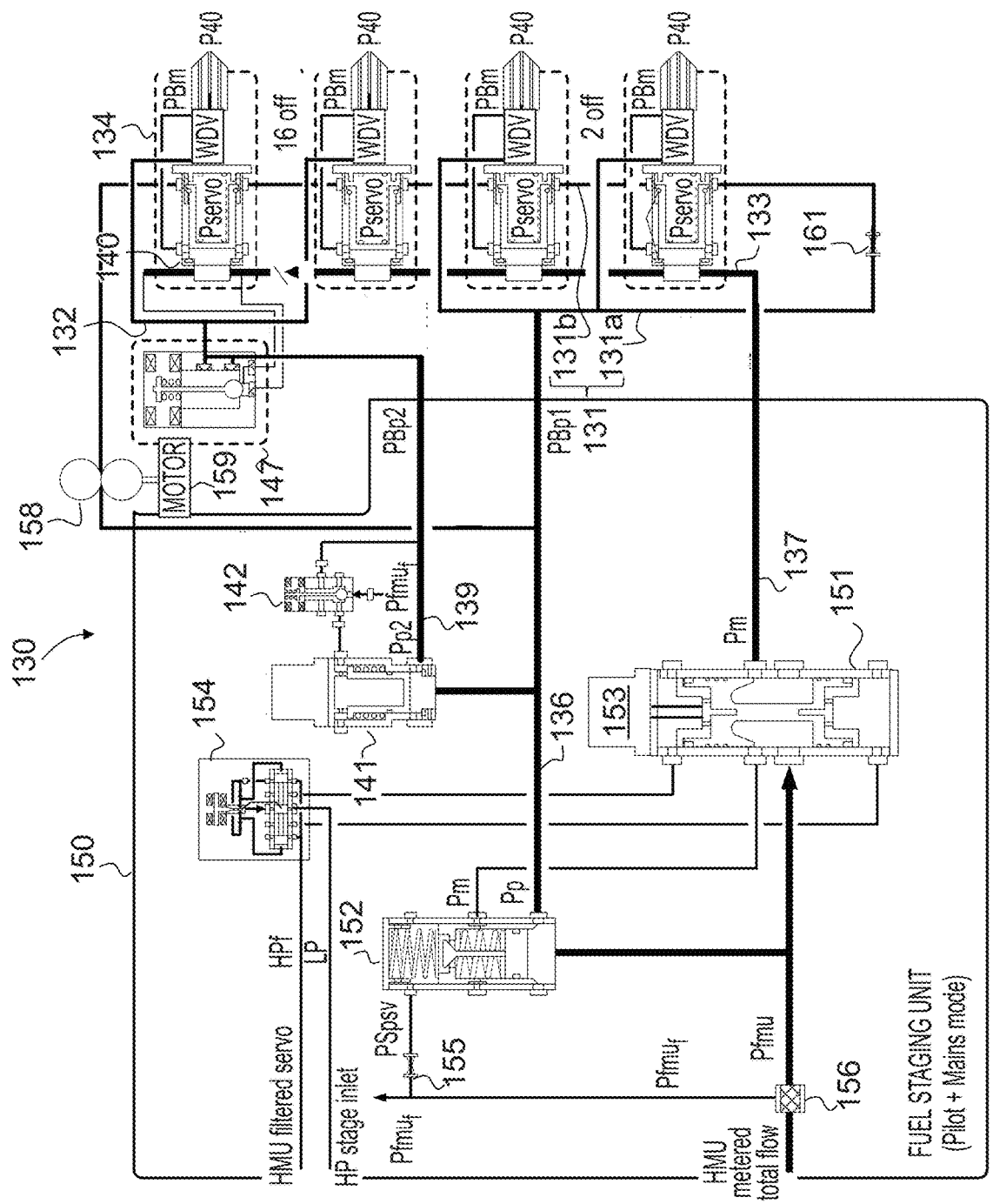
FIG. 11 shows schematically the staging system of FIG. 10 in pilot+mains operation mode.

FIGS. 10 and 11 show a further staging system 130, in respectively pilot-only operation mode and pilot+mains operation mode, which also uses pressurised fuel to increase the force available to close mains flow control valves (in this case FSVs).

Parts of the staging system 130 are similar or identical to the corresponding parts of the system 330 shown in FIG. 1. Thus the staging system 130 splits the fuel under the control of the EEC into two flows: one for first 131 and second 132 pilot manifolds and the other for a mains manifold 133. The first pilot manifold feeds pilot discharge orifices of a subset of the fuel injectors (via respective weight distribution valves—WDVs). The second pilot manifold feeds pilot discharge orifices of the rest of the fuel injectors (also via respective WDVs). The mains manifold feeds mains discharge orifices of all the fuel injectors. Mains FSVs 140 are provided at the injectors.

Other parts of the staging system 130 are similar or identical to the corresponding parts of the system 30 shown in FIGS. 3 and 4. Thus a splitting unit 150 having a metering and spill architecture receives the metered total fuel flow from the HMU and produces an outgoing flow split between a pilot connection pipe 136 which delivers fuel to the first 131 and second 132 pilot manifolds and a mains connection pipe 137 which delivers fuel to the mains manifold 133. The second pilot manifold 132 connects to the pilot connection pipe 136 via a further connection pipe 139 and a lean blow out protection valve 141 controlled by way of a solenoid-operated control valve (LBSV) 142. The splitting unit also sends a cooling flow to the mains manifold during pilot-only operation. The splitting unit 150 includes a staging metering valve (SMV) 151, a spill valve (SSV) 152, an LVDT 153 on the SMV, a two stage servo-valve (MSV) 154, a fixed servo orifice (SSO) 155, and a flow washed filter (SFWF) 156. These components perform the same functions as the corresponding components of the splitting unit 50 of FIGS. 3 and 4.

The high pressure feed for the LBSV 142 can be configured to be taken from the SFWF 156 at the inlet to the splitting unit 150. Any leakage flow from this feed then returns to the second pilot manifold 132 via the connection pipe 139.

The system 130 has a single-stage solenoid-operated mains cooling valve 147 which in pilot-only operation opens a bypass connection between the mains 133 and second pilot 132 fuel manifolds, allowing the cooling flow sent to the mains manifold 133 during pilot-only operation to pass from the mains fuel manifold to the pilot fuel manifold, and thence onwards for burning at the pilot orifices of the injectors 134. The mains cooling valve 147 closes during pilot-and-mains operation. The operation of the mains cooling valve is explained further below as part of the discussion of the mains FSVs 140 and the split first pilot fuel manifold 131.

A difference between the staging system 130 shown in FIGS. 10 and 11 and the known system 330 shown in FIG. 1, and the system shown in FIGS. 3 and 4 is that the first pilot fuel manifold 131 is split into a primary line 131a and a servo line 131b which each receive a respective portion of the pilot fuel flow. The primary line 131a directs its portion of the pilot flow to pilot discharge orifices in the injectors 134 via respective WDVs. The servo line 131b takes its portion of the pilot flow from the pilot connection pipe 136 through a variable speed servo pump (SSP) 158 powered by a hydraulic motor 159, before returning it to the primary line 131a via a back pressure orifice (BPO) 161, the SSP and the BPO acting to pressurise the fuel in the servo line. Operation of the mains FSVs 140 is controlled by a pressure differential between the mains fuel manifold 133 and the servo line 131b. The motive fluid for the motor is pressurised fuel obtained from the output of the HP pumping stage. The SSP and the hydraulic motor again form a motor and pump unit, and can be configured as described above in respect of any one of FIGS. 5 to 8. However, if a bidirectional motor and pump are wanted, then the configuration of FIG. 9 can be adopted.

The split first pilot fuel manifold 131 and the SSP 158 combine to enable the force available to close the main FSVs 140 to be increased. Thus when the mains flow is staged-out, the FSVs can assure a drip-tight seal between the upstream mains fuel manifold 133 and the downstream mains passageways of the fuel injectors 134 (thereby preventing fuel ingress into these mains passageways, which could result in fuel break down products causing internal blockages), and ensuring that the de-staged mains fuel manifold remains fully primed for rapid re-light when required. Importantly, the increased force available to close the FSVs also reduces the probability of an FSV failing partially or fully open in either operating mode (i.e. pilot-only or pilot+mains), thereby reducing the risk of flow mal-distribution and its undesirable effects on the engine.

The mains FSVs 140 distribute the mains flow from the mains fuel manifold 133 to the mains discharge orifices in the injectors 134, while a portion of the pilot flow is passed through the FSVs via the servo line 131b for valve cooling purposes and for increasing the available closure force. More particularly, as shown in FIGS. 10 and 11, the first pilot fuel manifold 131 is split into the primary 131a and servo 131b lines downstream of the point at which the further connection pipe 139 leading to the second pilot fuel manifold 132 branches from the pilot connection pipe 136. The SSP 158 draws part of the pilot flow for the first pilot manifold into the servo line 131b, the remaining part continuing through the primary line 131a. The servo line then extends through each mains FSV 140 in series, before reuniting with the primary line 131a downstream of the BPO 161. Thus the portion of the pilot flow diverted through the servo line ultimately returns to the primary line for burning.

The mains FSVs 140 each have a chamber containing a movable, spring-biased piston, with the chamber to a servo (spring) side of the piston being in fluid communication with the servo line 131b and the chamber to a mains (non-spring) side of the piston being in fluid communication with the mains fuel manifold 133. Two face seals in each FSV provide a drip tight seal so that the downstream injector passageways are isolated from the mains fuel manifold and the servo line when mains is de-staged and the FSVs are closed.

The pressure in the servo line 131b acts on the spring side of the pistons of the FSVs, and thus control of the servo line pressure is used to close the FSVs 140 on mains de-staging.

The servo line pressure is the outlet pressure of the SSP 158, and it depends upon the pump speed and the size of the restriction of the BPO 161.

Evidently no net flow into or out of the first pilot manifold 131 is caused by operation of the SSP 158, which just takes some of the flow for the first pilot manifold and pressurises it before returning it for burning. A relief valve connected across the SSP can be provided to limit pressures in the servo line 131b in the event of blockage of the BPO 161.

On closing the SMV 151 and opening the mains cooling valve 147 to deselect mains flow for pilot-only operation (FIG. 10), the pump speed of the SSP 158 is increased via the EEC to increase the flow passing through the servo line 131b and the BPO 161. This causes a significant rise in the servo pressure in the line acting to close the FSVs 140, thereby generating an increased closing force margin. Consequently, the reliability of the staging system 130 is improved, reducing the likelihood of an FSV failing partially or fully open.

Once the FSVs 140 are closed, the pump speed of the SSP 158 can be reduced so that it provides just sufficient cooling flow to maintain the temperature of the servo line 131b at an acceptably low level; at this time the pressures in the mains fuel manifold 133 and the servo line are substantially equal, with the FSVs being held closed by their spring loads. The speed reduction can be commanded after a set elapsed time or it can be signaled after detection of FSV closure via a pressure sensor (not shown) in the mains fuel manifold (such a signal can also be used for closed loop control of the manifold pressure).

In pilot+mains operation (FIG. 11), the mains cooling valve 147 is closed and the SMV 151 is opened. At the same time, the pump speed of the SSP 158 is reduced so that the pressure acting in the servo line 131b is only just above that in the primary line 131a. In this way, the pump speed can deliver a low cooling flow sufficient to maintain the servo line at an acceptably low temperature. As in the pilot-only operating mode, the servo line cooling flow is returned to the pilot line 131b and burned in the combustor, thereby reducing residence time and the possibility of fuel heating/breakdown in the servo line.

A benefit of achieving a higher FSV closing force margin by increasing servo-pressure is that it reduces reliance on the valve spring load to provide the closing force. This means that a relatively low spring load can be used, its primary function just being to hold the valve closed following the reduction in pump speed. Nonetheless, the spring load should still be significantly higher than valve friction levels in order to avoid unacceptable levels of flow mal-distribution between mains burner nozzles when mains flow is staged-in. However, with a relatively low spring load, the FSVs 140 can achieve low cracking pressures without significantly increasing their piston diameters. This is beneficial from a low mass and small packaging perspective.

This low cracking pressure differential greatly reduces the possibility of hazardous or major failure modes caused by failure of an FSV 140 in an open state. This is because if any one FSV does fail open, the flow through it does not increase significantly before generating sufficient pressure in the mains fuel manifold 133 to cause the other FSVs to open, thereby limiting the magnitude of fuel mal-distribution and diminishing its impact on the combustion process and turbine components.

Other variants of the staging system are possible. For example, the servo line may return to the servo pump in a closed loop after extending to the mains flow control valves. Thus in this variant the flow through the servo line may not be part of the metered total fuel flow, and is not burnt. In such a closed servo system the SSP can pump fuel from a dedicated fuel reservoir into the servo line which extends to the mains flow control valves. Thereafter the servo line leads through an orifice (to pressurise the line upstream of the orifice), before returning the pumped fuel to the reservoir. Such a closed loop recirculation option typically needs external cooling to prevent the pumped fuel overheating.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A fuel supply system of a gas turbine engine, comprising:
a fuel pump having a low pressure input and a high pressure output;
a fuel metering valve which is configured to receive a flow of pressurized fuel from the high pressure output and to form therefrom a metered total fuel flow; and
a combustion staging system for fuel injectors of a multi-stage combustor of the gas turbine engine,
wherein the combustion staging system comprises:
a splitting unit which receives the metered total fuel flow from the fuel metering valve and controllably splits the metered total fuel flow into an out-going pilot fuel flow and an out-going mains fuel flow to perform pilot-only and pilot-and-mains staging control of the combustor;
a pilot fuel manifold and a mains fuel manifold which respectively receive the pilot fuel flow and the mains fuel flow;
a plurality of mains flow control valves which distribute the mains fuel flow from the mains fuel manifold to mains discharge orifices of respective ones of the injectors of the combustor; and
a fuel servo line which extends through each of the mains flow control valves in series;
wherein each of the mains flow control valve has a chamber containing a movable piston, the chamber to a mains side of the piston being fed by the mains fuel manifold, the chamber to a servo side of the piston being fed by the fuel servo line, the piston having an open pilot-and-mains position which allows the mains fuel flow out of the mains side of the chamber to the mains discharge orifice of a respective one of the respective ones of the injectors, the piston being biased towards a closed pilot-only position which prevents the mains fuel flow out of the mains side of the chamber to the mains discharge orifice of the respective one of the respective ones of the injectors, and the piston being movable between the open pilot-and-mains position and the closed pilot-only position under a change in pressure in the fuel servo line relative to the mains fuel manifold,
wherein the combustion staging system further has a servo pump and a hydraulic motor which drives the servo pump, the servo pump being operable to change the pressure in the fuel servo line, and motive power for the hydraulic motor being fuel diverted from the high pressure output of the fuel pump, the hydraulic motor returning the diverted fuel to the low pressure input of the fuel pump, and wherein the servo pump operates upon, and the fuel servo line receives, a portion of a selected one of the pilot fuel flow and the mains fuel flow from the splitting unit, the fuel servo line returning said portion to rest of respective one of said selected one of the pilot fuel flow and the mains fuel flow after having extended to the mains flow control valves.

2. A fuel supply system according to claim 1, wherein the fuel pump has a pressure drop control arrangement including a further spill valve which is operable to maintain a substantially constant pressure drop across the fuel metering valve, the further spill valve connecting the high pressure output of the fuel pump to the low pressure input of the fuel pump, and the further spill valve being in parallel to the hydraulic motor.

3. A gas turbine engine having the fuel supply system according to claim 1.

4. The fuel supply system according to claim 1, wherein the combustion staging system further comprises a controller that receives the diverted fuel from the high pressure output of the fuel pump and that controllably feeds the diverted fuel to the hydraulic motor to vary the speed of the servo pump.

5. The fuel supply system according to claim 1, wherein the combustion staging system further comprises a sensor which senses an output of the servo pump.

6. The fuel supply system according to claim 1, wherein the fuel servo line has a back pressure orifice downstream of the mains flow control valves, the back pressure orifice maintaining the change in pressure in the fuel servo line.

7. The fuel supply system according to claim 1, wherein the mains fuel manifold is split into a primary line and the fuel servo line such that each line receives a respective portion of the mains fuel flow, both the primary line and the fuel servo line extending to the mains flow control valves before reuniting, the chamber of each mains flow control valve to the mains side of its piston being fed by the primary line, and the piston of each mains flow control valve being movable under an increase in pressure in the fuel servo line relative to the primary line to the open pilot-and-mains position.

8. The fuel supply system according to claim 7, wherein the mains flow control valves are binary operating valves which are either fully open or fully closed.

9. The fuel supply system according to claim 1, wherein the splitting unit includes a further metering valve and a spill valve, a first portion of the metered total fuel flow received by the splitting unit being an inflow to the further metering valve and a second portion of the metered total fuel flow received by the splitting unit being an inflow to the spill valve, the further metering valve being configured to controllably determine a fuel flow rate of a metered outflow formed from the first portion of the metered total fuel flow, the spill valve being configured to produce a spilled outflow formed from the second portion of the metered total fuel flow, and the spill valve being further configured to sense a pressure differential between the inflow to and the metered outflow from the further metering valve and to vary the amount of the spilled outflow in response to the sensed pressure differential, whereby the metered outflow forms one of the pilot and mains fuel flows, and the spilled outflow forms the other of the pilot and mains fuel flows.

\* \* \* \* \*